United States Patent
Yang et al.

(10) Patent No.: US 12,550,056 B2
(45) Date of Patent: Feb. 10, 2026

(54) INFORMATION TRANSMISSION METHOD, APPARATUS, NETWORK SIDE DEVICE, AND TERMINAL

(71) Applicant: DATANG MOBILE COMMUNICATIONS EQUIPMENT CO., LTD., Beijing (CN)

(72) Inventors: Meiying Yang, Beijing (CN); Jiaqing Wang, Beijing (CN); Chen Luo, Beijing (CN); Yaomin Li, Beijing (CN); Yuwan Su, Beijing (CN); Fangchen Cheng, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 19/103,119

(22) PCT Filed: Jul. 25, 2023

(86) PCT No.: PCT/CN2023/109127
§ 371 (c)(1),
(2) Date: Feb. 11, 2025

(87) PCT Pub. No.: WO2024/032367
PCT Pub. Date: Feb. 15, 2024

(65) Prior Publication Data
US 2025/0267573 A1    Aug. 21, 2025

(30) Foreign Application Priority Data
Aug. 12, 2022  (CN) .......................... 202210967576.X

(51) Int. Cl.
*H04W 52/02* (2009.01)
*H04W 72/044* (2023.01)
(Continued)

(52) U.S. Cl.
CPC ... *H04W 52/0209* (2013.01); *H04W 72/0446* (2013.01); *H04W 72/046* (2013.01); *H04W 72/232* (2023.01)

(58) Field of Classification Search
CPC .......... H04W 72/0209; H04W 72/232; H04W 72/0446; H04W 72/046
See application file for complete search history.

(56) References Cited

U.S. PATENT DOCUMENTS

2021/0195529 A1*  6/2021  Yang ..................... H04W 80/02
2021/0259044 A1   8/2021  Islam et al.
(Continued)

FOREIGN PATENT DOCUMENTS

| CN | 106792737 A | 5/2017 |
| CN | 111436164 A | 7/2020 |

(Continued)

OTHER PUBLICATIONS

PCT Written Opinion from PCT/CN2023/109127 mailed on Oct. 26, 2023, and its English translation provided by WIPO.
(Continued)

*Primary Examiner* — Melvin C Marcelo
(74) *Attorney, Agent, or Firm* — Ladas & Parry, LLP

(57) ABSTRACT

The present disclosure provides an information transmission method, apparatus, network-side device and terminal to solve the problem that there is no standardized solution for base-station energy-saving information indication and no corresponding signaling design in the network energy-saving technical solution. The information transmission method includes: sending dynamic signaling to the terminal, the dynamic signaling is used to indicate at least one of the base-station energy-saving information at a cell level, the base-station energy-saving information at a level of a group of terminals, and the base-station energy-saving information (Continued)

--- sending dynamic signaling to a terminal, wherein the dynamic signaling is used to indicate at least one of base-station energy-saving information at a cell level, base-station energy-saving information at a level of groups of terminals, and base-station energy-saving information at a terminal level; the base-station energy-saving information includes at least one of the following: energy-saving information of a time domain, the energy-saving information of the time domain including energy-saving information of at least one time-domain energy-saving solution; energy-saving information of a frequency domain, the energy-saving information of the frequency domain including energy-saving information of at least one frequency-domain energy-saving solution; energy-saving information of a spatial domain, the energy-saving information of the spatial domain including energy-saving information of at least one spatial-domain energy-saving solution; energy-saving information of a power domain, the energy-saving information of the power domain including energy-saving information of at least one power-domain energy-saving solution; other energy-saving information of another domain other than the time domain, the frequency domain, the spatial domain, and the power domain, the other energy-saving information including energy-saving information of at least one another energy-saving solution

— 101 at a terminal level; wherein the base-station energy-saving information includes at least one of the following: energy-saving information of a time domain; energy-saving information of a frequency domain; spatial domain energy-saving information; energy-saving information of a power domain; other energy-saving information except time domain, the frequency domain, the spatial domain, the power domain.

20 Claims, 14 Drawing Sheets

(51) Int. Cl.
  *H04W 72/0446* (2023.01)
  *H04W 72/232* (2023.01)

(56) References Cited

U.S. PATENT DOCUMENTS

| | | | |
|---|---|---|---|
| 2021/0345249 A1 | 11/2021 | Xue et al. | |
| 2023/0048856 A1 | 2/2023 | Yang et al. | |
| 2024/0298261 A1 | 9/2024 | Yang et al. | |
| 2024/0388345 A1* | 11/2024 | Yi | H04W 72/1268 |
| 2025/0105900 A1* | 3/2025 | Tseng | H04L 5/0048 |

FOREIGN PATENT DOCUMENTS

| | | | |
|---|---|---|---|
| CN | 113115484 A | 7/2021 | |
| WO | 2020200003 A1 | 10/2020 | |
| WO | 2022152038 A1 | 7/2022 | |
| WO | WO-2024214572 A1 * | 10/2024 | H04W 72/23 |

OTHER PUBLICATIONS

PCT International Search Report and Written Opinion from PCT/CN2023/109127 mailed on Oct. 26, 2023, and its English translation.

Ericsson, "Enhancements to support UE power saving mode", 3GPP TSG-CT WG1 Meeting #86, Guangzhou, PRC, Jan. 20-24, 2014, C1-140041.

Extended search report from corresponding European Patent Application No. 23851589.4 dated Aug. 20, 2025.

* cited by examiner sending dynamic signaling to a terminal, wherein the dynamic signaling is used to indicate at least one of base-station energy-saving information at a cell level, base-station energy-saving information at a level of groups of terminals, and base-station energy-saving information at a terminal level; the base-station energy-saving information includes at least one of the following: energy-saving information of a time domain, the energy-saving information of the time domain including energy-saving information of at least one time-domain energy-saving solution; energy-saving information of a frequency domain, the energy-saving information of the frequency domain including energy-saving information of at least one frequency-domain energy-saving solution; energy-saving information of a spatial domain, the energy-saving information of the spatial domain including energy-saving information of at least one spatial-domain energy-saving solution; energy-saving information of a power domain, the energy-saving information of the power domain including energy-saving information of at least one power-domain energy-saving solution; other energy-saving information of another domain other than the time domain, the frequency domain, the spatial domain, and the power domain, the other energy-saving information including energy-saving information of at least one another energy-saving solution

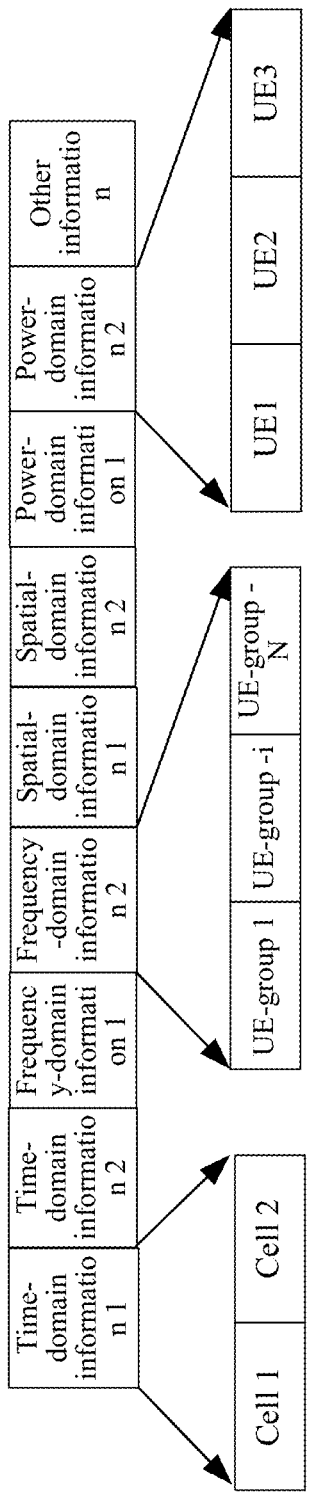
FIG.5
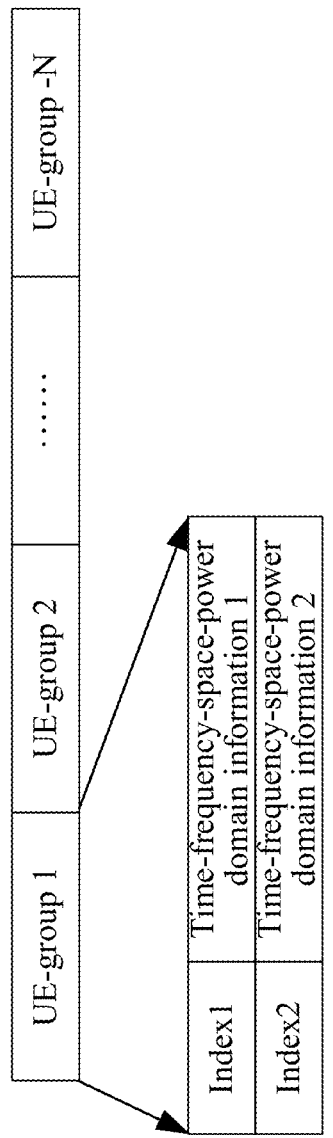
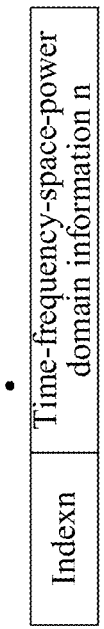
FIG.6

INFORMATION TRANSMISSION METHOD, APPARATUS, NETWORK SIDE DEVICE, AND TERMINAL

CROSS-REFERENCE TO RELATED APPLICATIONS

This application is a U.S. national stage application of PCT application No. PCT/CN2023/109127 filed on Jul. 25, 2023, which claims a priority to Chinese Patent Application No. 202210967576.X filed on Aug. 12, 2022, the disclosures of which are incorporated in their entireties by reference herein.

TECHNICAL FIELD

The present disclosure relates to the field of communication technology, and in particular to an information transmission method, apparatus, network-side device and terminal.

BACKGROUND

As well-known, energy consumption is a main indicator of operators' operating expense (OPEX). The energy consumption of the 5th Generation Mobile Communication Technology (5G) network is about 2 to 3 times that of the 4th Generation Mobile Communication Technology (4G) network, so the research on energy-saving technology for energy consumption of the 5G network is imminent.

In the R18 version of 5G New Radio (NR), the standardization of network energy-saving is considered. However, in the current network energy-saving technical solutions, there is no standardized solution for base-station energy-saving information indication, nor is there a corresponding signaling design.

SUMMARY

The present disclosure is to provide an information transmission method, an information transmission device, a network-side device and a terminal to solve the problem that there is no standardized solution for base-station energy-saving information indication and no corresponding signaling design in the network energy-saving technical solution of the related art.

In order to achieve the above technical purpose, in a first aspect, an information transmission method applied to a network side device is provided. The method includes: sending dynamic signaling to a terminal, wherein the dynamic signaling is used to indicate at least one of base-station energy-saving information at a cell level, base-station energy-saving information at a level of a group of terminals, and base-station energy-saving information at a terminal level; the base-station energy-saving information includes at least one of the following: energy-saving information of a time domain, the energy-saving information of the time domain including energy-saving information of at least one time-domain energy-saving solution; energy-saving information of a frequency domain, the energy-saving information of the frequency domain including energy-saving information of at least one frequency-domain energy-saving solution; energy-saving information of a spatial domain, the energy-saving information of the spatial domain including energy-saving information of at least one spatial-domain energy-saving solution; energy-saving information of a power domain, the energy-saving information of the power domain including energy-saving information of at least one power-domain energy-saving solution; other energy-saving information of another domain other than the time domain, the frequency domain, the spatial domain, and the power domain, the other energy-saving information including energy-saving information of at least one another energy-saving solution.

Optionally, the dynamic signaling is downlink control information (DCI) or a media access control control element (MAC-CE).

Optionally, when the dynamic signaling is DCI, the DCI is DCI scrambled by at least one base-station energy-saving radio network temporary identifier (RNTI).

Optionally, the dynamic signaling is used to indicate the base-station energy-saving information of at least one terminal group; the base-station energy-saving information of each of the at least one terminal group includes at least one of the energy-saving information of the time domain, the energy-saving information of the frequency domain, the energy-saving information of the spatial domain, the energy-saving information of the power domain, and the other energy-saving information.

Optionally, the dynamic signaling is used to indicate at least one of the energy-saving information of the time domain, the energy-saving information of the frequency domain, the energy-saving information of the spatial domain, the energy-saving information of the power domain, and the another energy-saving information; wherein, the energy-saving information of each energy-saving domain of the time domain, the frequency domain, the spatial domain, the power domain and the another domain includes energy-saving information for at least one terminal group of the energy-saving domain, and the energy-saving information of each of the at least one terminal group includes energy-saving information of the at least one energy-saving solution of the energy-saving domain, and the energy-saving domain includes one of the time domain, the frequency domain, the spatial domain, the power domain, and the another domain other than the time domain, the frequency domain, the spatial domain and the power domain.

Optionally, the dynamic signaling is used to indicate at least one of the following: energy-saving information of at least one time-domain energy-saving solution; energy-saving information of at least one frequency-domain energy-saving solution; energy-saving information of at least one spatial-domain energy-saving solution; energy-saving information of at least one power-domain energy-saving solution; energy-saving information of at least one another energy-saving solution; wherein, the energy-saving information of each energy-saving solution of the time-domain energy-saving solution, the frequency-domain energy-saving solution, the spatial-domain energy-saving solution, the power-domain energy-saving solution, and another energy-saving solution includes energy-saving information of at least one terminal group, and the energy-saving domain corresponding to the energy-saving information of the at least one terminal group is the same as the energy-saving domain corresponding to the energy-saving information of the energy-saving solution, and the energy-saving domain includes one of the time domain, the frequency domain, the spatial domain, the power domain, and the another domain other than the time domain, the frequency domain, the spatial domain, the power domain.

Optionally, the dynamic signaling is used to indicate at least one of the following: energy-saving information of at least one time-domain energy-saving solution; energy-saving information of at least one frequency-domain energy-saving solution; energy-saving information for at least one spatial-domain energy-saving solution; energy-saving information of at least one power-domain energy-saving solution; energy-saving information of at least one another energy-saving solution; wherein the energy-saving information of each energy-saving solution of the time-domain energy-saving solution, the frequency-domain energy-saving solution, the spatial-domain energy-saving solution, the power-domain energy-saving solution, and the another energy-saving solution includes at least one of the energy-saving information at the cell level, the energy-saving information at the level of a group of terminals, and the energy-saving information at the terminal level of the energy-saving domain corresponding to the energy-saving information of the energy-saving solution, and the energy-saving domain includes one of the time domain, the frequency domain, the spatial domain, the power domain, and the another domain other than the time domain, the frequency domain, the spatial domain, and the power domain.

Optionally, the dynamic signaling includes a first bit field identifier, and energy-saving information of energy-saving solutions of different energy-saving domains is indicated by the first bit field identifier; or, the dynamic signaling includes a second bit field identifier and a radio resource control RRC identifier, and energy-saving information of energy-saving solutions of different energy-saving domains is jointly indicated by the second bit field identifier and the RRC identifier; or, the dynamic signaling includes bit information representing a time-frequency-space domain unit, and energy-saving information of energy-saving solutions in different energy-saving domains is indicated by the bit information, and the energy-saving domain includes one of a time domain, a frequency domain, a spatial domain, a power domain, and another domain other than the time domain, the frequency domain, the spatial domain, and the power domain.

Optionally, the dynamic signaling includes a third bit field identifier, and the third bit field identifier is used to indicate whether the energy-saving information of energy-saving solutions of different energy-saving domains is updated; when the third bit field identifier indicates that the energy-saving information of an energy-saving solution of a target energy-saving domain in the different energy-saving domains is updated, the bit field identifier corresponding to the energy-saving information of the energy-saving solution of the target energy-saving domain is used to indicate the updated energy-saving information, and the energy-saving domain includes one of the time domain, the frequency domain, the spatial domain, the power domain, and another domain other than the time domain, the frequency domain, the spatial domain, and the power domain.

Optionally, the dynamic signaling further includes a fourth bit field identifier, the fourth bit field identifier is used to indicate whether at least one of the base-station energy-saving information at the cell level, the base-station energy-saving information at the level of a group of terminals, and the base-station energy-saving information at the terminal level is updated; when the fourth bit field identifier indicates that the base-station energy-saving information at a target level is updated, and the third bit field identifier corresponding to the base-station energy-saving information at the target level indicates that the energy-saving information of the energy-saving solution of the target energy-saving domain is updated, the bit field identifier corresponding to the energy-saving information of the energy-saving solution of the target energy-saving domain contained in the base-station energy-saving information at the target level is used to indicate the updated energy-saving information; or when the third bit field identifier indicates that the energy-saving information of the energy-saving solution of the target energy-saving domain is updated, and the fourth bit field identifier indicates that the base-station energy-saving information at the target level is updated, the bit field identifier corresponding to the energy-saving information of the energy-saving solution of the target energy-saving domain contained in the base-station energy-saving information at the target level is used to indicate the updated energy-saving information, and the target level is one of the cell level, the level of a group of terminals, and the terminal level.

Optionally, the method further includes: configuring at least one base-station energy-saving RNTI; scrambling a first instruction according to the at least one base-station energy-saving RNTI, and obtaining the dynamic signaling; wherein the at least one base-station energy-saving RNTI is used to indicate at least one of the following: grouping of energy-saving information types; grouping at the level of a group of terminals; grouping at the cell level and the level of a group of terminals; grouping at the cell level and the terminal level; grouping at the level of a group of terminals and the terminal level; grouping of information contents of energy-saving information types.

Optionally, the time-domain energy-saving solution includes at least one of the following: a transmission indication of a first object, wherein the first object includes a common signal and/or a common channel; a transmission indication of a second object, wherein the second object includes: at least one of a semi-persistent signal, a semi-persistent channel, a periodic signal, and a periodic channel; a dynamic cell shutdown indication; indications related to reference signals; an indication of a discontinuous reception configuration of a terminal; an indication of a discontinuous transmission configuration or a discontinuous reception configuration of a base station; indication of an energy-saving status of the base station.

Optionally, the frequency-domain energy-saving solution includes at least one of the following: dynamic bandwidth adjustment indication of terminal groups; shutdown indication of dynamic cells under multi-carrier; status indication of the secondary cell; a switching indication of dynamic primary cells of terminal groups; a parameter set switching indication for different frequency domain states of the base station.

Optionally, the spatial-domain energy-saving solution includes at least one of the following: a switching indication of parameter sets of base-station spatial-domain unit parameters; instructions for adjusting base-station spatial-domain unit parameters; a configuration indication of a reference signal; a joint indication of a first spatial-domain unit parameter and a reference signal configuration, wherein the first spatial-domain unit parameter includes a quantity of spatial-domain units or a spatial-domain unit index; channel state information reference signal CSI-RS measurement or reporting configuration; dynamic adjustment power indication.

Optionally, the power-domain energy-saving solution includes at least one of the following: a transmit power of a first information; an offset value of the transmit power of the first information relative to a reference power; an indication of whether the transmit power of the first information is zero; the first information includes at least one of a target signal, a target channel, a target time resource, a target frequency-domain resource, and a target spatial-domain resource; the reference power is a transmit power of at least one of a reference signal, a reference channel, a reference time-domain resource, a reference frequency-domain resource, and a reference spatial-domain resource.

Optionally, the another energy-saving solution includes at least one of the following: a solution of power amplifier coefficient adjustment; a solution of peak to average power ratio reduction.

In a second aspect, an information transmission method applied to a terminal is provided. The method includes: receiving dynamic signaling from a network-side device, wherein the dynamic signaling is used to indicate at least one of base-station energy-saving information at a cell level, base-station energy-saving information at a level of a group of terminals, and base-station energy-saving information at a terminal level; performing information transmission according to the dynamic signaling; wherein the base-station energy-saving information includes at least one of the following: energy-saving information of a time domain, the energy-saving information of the time domain including energy-saving information of at least one time-domain energy-saving solution; energy-saving information of a frequency domain, the energy-saving information of the frequency domain including energy-saving information of at least one frequency-domain energy-saving solution; energy-saving information of a spatial domain, the energy-saving information of the spatial domain including energy-saving information of at least one spatial-domain energy-saving solution; energy-saving information of a power domain, the energy-saving information of the power domain including energy-saving information of at least one power-domain energy-saving solution; other energy-saving information of another domain other than the time domain, the frequency domain, the spatial domain, and the power domain, the other energy-saving information including energy-saving information of at least one another energy-saving solution.

Optionally, performing the information transmission according to the dynamic signaling includes: according to the dynamic signaling, obtaining target base-station energy-saving information corresponding to the terminal; performing the information transmission according to the target base-station energy-saving information.

Optionally, the dynamic signaling is downlink control information DCI or media access control control element MAC-CE.

Optionally, when the dynamic signaling is DCI, the DCI is DCI scrambled by at least one base-station energy-saving radio network temporary identifier RNTI.

Optionally, the dynamic signaling is used to indicate the base-station energy-saving information of at least one terminal group; the base-station energy-saving information of each of the at least one terminal group includes at least one of the energy-saving information of the time domain, the energy-saving information of the frequency domain, the energy-saving information of the spatial domain, the energy-saving information of the power domain, and the another energy-saving information.

Optionally, the dynamic signaling is used to indicate at least one of the energy-saving information of the time domain, the energy-saving information of the frequency domain, the energy-saving information of the spatial domain, the energy-saving information of the power domain, and the another energy-saving information; wherein, the energy-saving information of each energy-saving domain of the time domain, the frequency domain, the spatial domain, the power domain and the another domain includes energy-saving information for at least one terminal group of the energy-saving domain, and the energy-saving information of each of the at least one terminal group includes energy-saving information of the at least one energy-saving solution of the energy-saving domain, and the energy-saving domain includes one of the time domain, the frequency domain, the spatial domain, the power domain, and the another domain other than the time domain, the frequency domain, the spatial domain and the power domain.

Optionally, the dynamic signaling is used to indicate at least one of the following: energy-saving information of at least one time-domain energy-saving solution; energy-saving information of at least one frequency-domain energy-saving solution; energy-saving information of at least one spatial-domain energy-saving solution; energy-saving information of at least one power-domain energy-saving solution; energy-saving information of at least one another energy-saving solution; wherein, the energy-saving information of each energy-saving solution of the time-domain energy-saving solution, the frequency-domain energy-saving solution, the spatial-domain energy-saving solution, the power-domain energy-saving solution, and another energy-saving solution includes energy-saving information of at least one terminal group, and the energy-saving domain corresponding to the energy-saving information of the at least one terminal group is the same as the energy-saving domain corresponding to the energy-saving information of the energy-saving solution, and the energy-saving domain includes one of the time domain, the frequency domain, the spatial domain, the power domain, and the another domain other than the time domain, the frequency domain, the spatial domain, the power domain.

Optionally, the dynamic signaling is used to indicate at least one of the following: energy-saving information of at least one time-domain energy-saving solution; energy-saving information of at least one frequency-domain energy-saving solution; energy-saving information for at least one spatial-domain energy-saving solution; energy-saving information of at least one power-domain energy-saving solution; energy-saving information of at least one another energy-saving solution; wherein the energy-saving information of each energy-saving solution of the time-domain energy-saving solution, the frequency-domain energy-saving solution, the spatial-domain energy-saving solution, the power-domain energy-saving solution, and the another energy-saving solution includes at least one of the energy-saving information at the cell level, the energy-saving information at the level of a group of terminals, and the energy-saving information at the terminal level of the energy-saving domain corresponding to the energy-saving information of the energy-saving solution, and the energy-saving domain includes one of the time domain, the frequency domain, the spatial domain, the power domain, and the another domain other than the time domain, the frequency domain, the spatial domain, and the power domain.

Optionally, the dynamic signaling includes a first bit field identifier, and energy-saving information of energy-saving solutions of different energy-saving domains is indicated by the first bit field identifier; or, the dynamic signaling includes a second bit field identifier and a radio resource control RRC identifier, and energy-saving information of energy-saving solutions of different energy-saving domains is jointly indicated by the second bit field identifier and the RRC identifier; or, the dynamic signaling includes bit information representing a time-frequency-space domain unit, and energy-saving information of energy-saving solutions in different energy-saving domains is indicated by the bit information, and the energy-saving domain includes one of a time domain, a frequency domain, a spatial domain, a power domain, and another domain other than the time domain, the frequency domain, the spatial domain, and the power domain.

Optionally, the dynamic signaling includes a third bit field identifier, and the third bit field identifier is used to indicate whether the energy-saving information of energy-saving solutions of different energy-saving domains is updated; when the third bit field identifier indicates that the energy-saving information of an energy-saving solution of a target energy-saving domain in the different energy-saving domains is updated, the bit field identifier corresponding to the energy-saving information of the energy-saving solution of the target energy-saving domain is used to indicate the updated energy-saving information, and the energy-saving domain includes one of the time domain, the frequency domain, the spatial domain, the power domain, and another domain other than the time domain, the frequency domain, the spatial domain, and the power domain.

Optionally, the dynamic signaling further includes a fourth bit field identifier, the fourth bit field identifier is used to indicate whether at least one of the base-station energy-saving information at the cell level, the base-station energy-saving information at the level of a group of terminals, and the base-station energy-saving information at the terminal level is updated; when the fourth bit field identifier indicates that the base-station energy-saving information at a target level is updated, and the third bit field identifier corresponding to the base-station energy-saving information at the target level indicates that the energy-saving information of the energy-saving solution of the target energy-saving domain is updated, the bit field identifier corresponding to the energy-saving information of the energy-saving solution of the target energy-saving domain contained in the base-station energy-saving information at the target level is used to indicate the updated energy-saving information; or when the third bit field identifier indicates that the energy-saving information of the energy-saving solution of the target energy-saving domain is updated, and the fourth bit field identifier indicates that the base-station energy-saving information at the target level is updated, the bit field identifier corresponding to the energy-saving information of the energy-saving solution of the target energy-saving domain contained in the base-station energy-saving information at the target level is used to indicate the updated energy-saving information, and the target level is one of the cell level, the level of a group of terminals, and the terminal level.

Optionally, the time-domain energy-saving solution includes at least one of the following: a transmission indication of a first object, wherein the first object includes a common signal and/or a common channel; a transmission indication of a second object, wherein the second object includes: at least one of a semi-persistent signal, a semi-persistent channel, a periodic signal, and a periodic channel; a dynamic cell shutdown indication; indications related to reference signals; an indication of a discontinuous reception configuration of a terminal; an indication of a discontinuous transmission configuration or a discontinuous reception configuration of a base station; indication of an energy-saving status of the base station.

Optionally, the frequency-domain energy-saving solution includes at least one of the following: dynamic bandwidth adjustment indication of terminal groups; shutdown indication of dynamic cells under multi-carrier; status indication of the secondary cell; a switching indication of dynamic primary cells of terminal groups; a parameter set switching indication for different frequency domain states of the base station.

Optionally, the spatial-domain energy-saving solution includes at least one of the following: a switching indication of parameter sets of base-station spatial-domain unit parameters; instructions for adjusting base-station spatial-domain unit parameters; a configuration indication of a reference signal; a joint indication of a first spatial-domain unit parameter and a reference signal configuration, wherein the first spatial-domain unit parameter includes a quantity of spatial-domain units or a spatial-domain unit index; channel state information reference signal CSI-RS measurement or reporting configuration; dynamic adjustment power indication.

Optionally, the power-domain energy-saving solution includes at least one of the following: a transmit power of a first information; an offset value of the transmit power of the first information relative to a reference power; an indication of whether the transmit power of the first information is zero; the first information includes at least one of a target signal, a target channel, a target time resource, a target frequency-domain resource, and a target spatial-domain resource; the reference power is a transmit power of at least one of a reference signal, a reference channel, a reference time-domain resource, a reference frequency-domain resource, and a reference spatial-domain resource.

Optionally, the another energy-saving solution includes at least one of the following: a solution of power amplifier coefficient adjustment; a solution of peak to average power ratio reduction.

In a third aspect, a network side device is provided. The network side device includes: a memory, a transceiver, and a processor, wherein the memory is used to store a program; the transceiver is used to send and receive data under the control of the processor; the processor is used to read the program in the memory and perform the following operations: sending dynamic signaling to a terminal through the transceiver, wherein the dynamic signaling is used to indicate at least one of base-station energy-saving information at a cell level, base-station energy-saving information at a level of a group of terminals, and base-station energy-saving information at a terminal level; the base-station energy-saving information includes at least one of the following: energy-saving information of a time domain, the energy-saving information of the time domain including energy-saving information of at least one time-domain energy-saving solution; energy-saving information of a frequency domain, the energy-saving information of the frequency domain including energy-saving information of at least one frequency-domain energy-saving solution; energy-saving information of a spatial domain, the energy-saving information of the spatial domain including energy-saving information of at least one spatial-domain energy-saving solution; energy-saving information of a power domain, the energy-saving information of the power domain including energy-saving information of at least one power-domain energy-saving solution; other energy-saving information of another domain other than the time domain, the frequency domain, the spatial domain, and the power domain, the other energy-saving information including energy-saving information of at least one another energy-saving solution.

In a fourth aspect, an information transmission device is provided. The information transmission device includes: a sending unit, configured to send dynamic signaling to a terminal, wherein the dynamic signaling is used to indicate at least one of base-station energy-saving information at a cell level, base-station energy-saving information at a level of a group of terminals, and base-station energy-saving information at a terminal level; the base-station energy-saving information includes at least one of the following: energy-saving information of a time domain, the energy-saving information of the time domain including energy-saving information of at least one time-domain energy-saving solution; energy-saving information of a frequency domain, the energy-saving information of the frequency domain including energy-saving information of at least one frequency-domain energy-saving solution; energy-saving information of a spatial domain, the energy-saving information of the spatial domain including energy-saving information of at least one spatial-domain energy-saving solution; energy-saving information of a power domain, the energy-saving information of the power domain including energy-saving information of at least one power-domain energy-saving solution; other energy-saving information of another domain other than the time domain, the frequency domain, the spatial domain, and the power domain, the other energy-saving information including energy-saving information of at least one another energy-saving solution.

In fifth aspect, a terminal is provided in the embodiments of the present disclosure. The terminal includes: a memory, a transceiver, and a processor, wherein the memory is used to store a program; the transceiver is used to send and receive data under the control of the processor; the processor is used to read the program in the memory and perform the following operations: receiving dynamic signaling from a network-side device through the transceiver, wherein the dynamic signaling is used to indicate at least one of base-station energy-saving information at a cell level, base-station energy-saving information at a level of a group of terminals, and base-station energy-saving information at a terminal level; performing information transmission according to the dynamic signaling; wherein the base-station energy-saving information includes at least one of the following: energy-saving information of a time domain, the energy-saving information of the time domain including energy-saving information of at least one time-domain energy-saving solution; energy-saving information of a frequency domain, the energy-saving information of the frequency domain including energy-saving information of at least one frequency-domain energy-saving solution; energy-saving information of a spatial domain, the energy-saving information of the spatial domain including energy-saving information of at least one spatial-domain energy-saving solution; energy-saving information of a power domain, the energy-saving information of the power domain including energy-saving information of at least one power-domain energy-saving solution; other energy-saving information of another domain other than the time domain, the frequency domain, the spatial domain, and the power domain, the other energy-saving information including energy-saving information of at least one another energy-saving solution.

In a fifth aspect, an information transmission device is provided. The information transmission device includes: a receiving unit, configured to receive dynamic signaling from a network-side device, wherein the dynamic signaling is used to indicate at least one of base-station energy-saving information at a cell level, base-station energy-saving information at a level of a group of terminals, and base-station energy-saving information at a terminal level; an information transmission unit, configured to perform information transmission according to the dynamic signaling; wherein the base-station energy-saving information includes at least one of the following: energy-saving information of a time domain, the energy-saving information of the time domain including energy-saving information of at least one time-domain energy-saving solution; energy-saving information of a frequency domain, the energy-saving information of the frequency domain including energy-saving information of at least one frequency-domain energy-saving solution; energy-saving information of a spatial domain, the energy-saving information of the spatial domain including energy-saving information of at least one spatial-domain energy-saving solution; energy-saving information of a power domain, the energy-saving information of the power domain including energy-saving information of at least one power-domain energy-saving solution; other energy-saving information of another domain other than the time domain, the frequency domain, the spatial domain, and the power domain, the other energy-saving information including energy-saving information of at least one another energy-saving solution.

In a seventh aspect, a processor-readable storage medium storing a computer program is provided, wherein the computer program is used to cause a processor to execute the steps of the information transmission method according to the first aspect, or to execute the steps of the information transmission method according to the second aspect.

The technical solutions disclosed in the present invention have at least the following beneficial effects.

In the above-mentioned technical solutions of the embodiments of the present disclosure, the network side device sends the dynamic signaling to the terminal, the dynamic signaling is used to indicate at least one of the base-station energy-saving information at the cell level, the base-station energy-saving information at the level of a group of terminals, and the base-station energy-saving information at the terminal level; wherein the base-station energy-saving information includes at least one of the following: energy-saving information of a time domain, the energy-saving information of a time domain includes energy-saving information of at least one time-domain energy-saving solution; energy-saving information of a frequency domain, the energy-saving information of a frequency domain includes energy-saving information of at least one frequency-domain energy-saving solution; energy-saving information of a spatial domain, the energy-saving information of a spatial domain includes energy-saving information of at least one spatial domain energy-saving solution; energy-saving information of a power domain, the energy-saving information of a power domain includes energy-saving information of at least one power-domain energy-saving solution; other energy-saving information other than the time domain, the frequency domain, the spatial domain and the power domain, other energy-saving information includes energy-saving information of at least one another energy-saving solution, so that all the information of the base station energy-saving is jointly indicated by dynamic signaling, the flexibility of the base-station energy-saving information indication is increased, and the energy consumption of the base station can be further reduced by the method of joint indication by dynamic signaling, and the signaling overhead of the base station is saved.

BRIEF DESCRIPTION OF THE DRAWINGS

FIG. 1 is a first schematic flowchart of an information transmission method according to an embodiment of the present disclosure;

FIG. 5 is a fourth example diagram of an indication format of first DCI scrambled by an energy-saving RNTI of a base station according to an embodiment of the present disclosure;

FIG. 6 is a fifth example diagram of an indication format of first DCI scrambled by an energy-saving RNTI of a base station according to an embodiment of the present disclosure;

DETAILED DESCRIPTION

Figure 2:
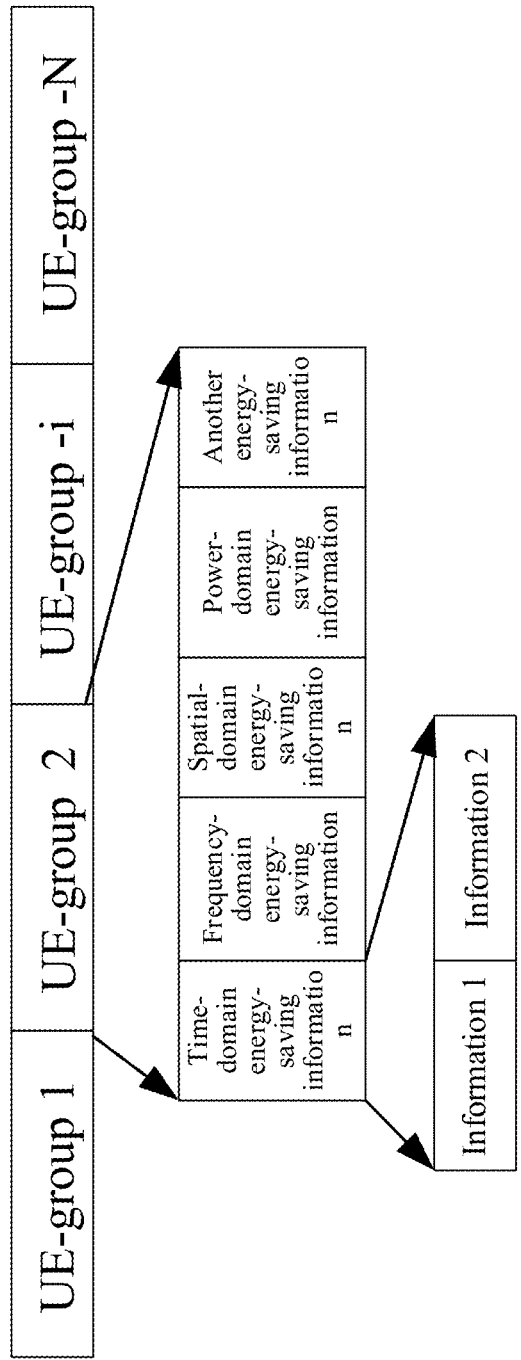
FIG. 2 is a first example diagram of an indication format of first DCI scrambled by an energy-saving RNTI of a base station according to an embodiment of the present disclosure.

The present disclosure, the term "and/or" describes the association relationship of associated objects, indicating that three relationships may exist. For example, A and/or B may represent three situations: A exists alone, A and B exist at the same time, and B exists alone. The character "/" generally indicates that the associated objects before and after are in an "or" relationship.

In the embodiments of the present application, the term "plurality" refers to two or more than two, and other quantifiers are similar.

The following will be combined with the drawings in the embodiments of the present application to clearly and completely describe the technical solutions in the embodiments of the present application. Obviously, the described embodiments are only part of the embodiments of the present application, not all of the embodiments. Based on the embodiments in the present application, all other embodiments obtained by ordinary technicians in this field without creative work are within the scope of protection of this application.

In the related technologies, for NR systems, energy-saving technologies for a base station are mostly product-implementation solutions and have not been standardized.

In addition, for the Long Term Evolution (LTE) system, in the R12 version, the small cell on/off technical solution is considered. In order to avoid interference between small base stations and macro base stations, the method of shutting down small base stations is used to reduce interference between the small base stations and the macro base stations. Furthermore, an additional benefit brought by this solution is that by shutting down the small base stations, the power consumption of the small base stations can be reduced. For the method of shutting down the small base stations, small cells in the R12 version adopt a semi-static configuration combined with a discovery signal to reduce the on/off conversion time of small cells.

In addition, for the NR user equipment (UE) energy-saving project, the energy-saving mode of DCI with CRC-scrambled by PS-RNTI (DCP, DCI with CRC scrambled by PS-RNTI) and paging early indication (PEI) is supported, where DCP is the wake-up signal mechanism in the radio resource control (RRC) connected state; PEI is the wake-up signal mechanism in the RRC idle state; DCP is DCI signaling which carries wake-up information, used to indicate whether the UE monitors the physical downlink control channel (PDCCH) in the subsequent discontinuous receiving (DRX) cycle; further, PEI is DCI signaling which carries wake-up information, used to indicate whether the UE monitors the PDCCH at the subsequent paging occasion (PO).

In summary, the related art adopts different indication methods for different energy-saving technologies, and there is no standardized solution for base-station energy-saving information indication, nor is there a corresponding signaling design.

In order to solve the above problems, the embodiments of the present application provide an information transmission method, device, network-side device and terminal, wherein the method and device are based on the same application concept. Since the principles of solving the problems by the method and device are similar, the implementation of the device and method can refer to each other, and the repeated parts will not be repeated.

As shown in FIG. 1, a flow chart of an information transmission method is provided in an embodiment of the present disclosure, the method is applied to a network side device. The method includes:

Step 101: sending dynamic signaling to a terminal, where the dynamic signaling is used to indicate at least one of base-station energy-saving information at a cell level, base-station energy-saving information at a level of a group of terminals, and base-station energy-saving information at a terminal level; the base-station energy-saving information includes at least one of the following: time-domain energy-saving information, wherein the time-domain energy-saving information includes energy-saving information of at least one time-domain energy-saving solution; frequency-domain energy-saving information, wherein the frequency-domain energy-saving information includes energy-saving information of at least one frequency-domain energy-saving solution; spatial-domain energy-saving information, wherein the spatial-domain energy-saving information includes energy-saving information of at least one spatial-domain energy-saving solution; power-domain energy-saving information, wherein the power-domain energy-saving information includes energy-saving information of at least one power-domain energy-saving solution.

In addition to the energy-saving information of a time domain, the energy-saving information of a frequency domain, the energy-saving information of a spatial domain, and the energy-saving information of a power domain, the other energy-saving information includes energy-saving information of at least one another energy-saving solution.

Optionally, the dynamic signaling is downlink control information (Downlink Control Information, DCI) or media access control unit (Media Access Control Control Element, MAC CE).

Specifically, when the dynamic signaling is DCI, the DCI is DCI scrambled by at least one base-station energy-saving radio network temporary identity (Radio Network Temporary Identity, RNTI).

Here, when the dynamic signaling is DCI, it may be based on at least one of the following formats: DCI format 0-2, DCI format 1-2, DCI format 2-x series, or may be a newly defined DCI format, such as DCI format 2-8.

Optionally, the time-domain energy-saving solution includes at least one of the following:

1) a transmission indication of a first object, where the first object includes a common signal and/or a common channel; the common signal and/or the common channel include at least one of the following:
   Synchronization Signal and PBCH block (SSB);
   System Information Block (SIB) 1;
   other SIBs;
   paging signals;
   Random Access Channel (RACH);
   optionally, energy-saving bit information indicates one of the following items related to the common signal and/or the common channel:
   whether to send;
   whether to activate the transmission, whether to activate the transmission can be indicated by A bits, for example, 1 bit;
   the transmission period, which can be indicated by the B bits; for example, 3 bits, optionally, an RRC index is used; for example, the base station configures the SSB period and the RRC index corresponding to the SSB period, the RRC index indicating the SSB period, such as 5 ms, 8 ms, 10 ms, 20 ms, 40 ms, 80 ms, 160 ms, 320 ms, etc.;
   switching of parameter sets;
   the transmitted carrier information, which may be indicated by the C bits; for example, 5 bits are used; for example, 5 bits indicate 32 carrier identities (Identity, ID); or 5 bits indicate the primary carrier or the secondary carrier number;
2) a transmission indication of a second object, wherein the second object includes at least one of a semi-persistent signal, a semi-persistent channel, a periodic signal, and a periodic channel;
   specifically, it can indicate whether a periodic signal or channel, or a semi-persistent signal or channel is sent, changed, or activated, or indicate the switching of a parameter set of a semi-persistent signal and/or a newly arrived transmission, for example, D bits×N signals/channels; wherein each signal/channel can be indicated by D bits, for example, 1 bit;
   it can also indicate changed configuration information (E bits×N signals/channels), where the new configuration information can be identified by the RRC index;
3) dynamic cell shutdown indication;
   optionally, the shutdown indication of the dynamic cell includes one of the following:
   periodic cell on/off and activation/deactivation signaling, which can be indicated by the F bits, for example, 1 bit identifies activation and deactivation;
   dynamic cell on/off identification, which can be indicated by G bits, for example, 1 bit indicates that the cell is turned off;
   dynamic cell on/off duration, which may be indicated by H bits, for example, the H bits indicate the duration of the cell off, and the duration of the cell off and/or on includes at least one of the following time granularities: symbol, slot, subframe, radio frame;
4) indications related to reference signals;
   the reference signal includes at least one of a discovery signal, a synchronization signal, and a SIB signal;
   optionally, the indication related to the reference signal includes one of the following:
   activation and/or deactivation of a periodic reference signal or an on-demand reference signal, which may be indicated by 1 bit, for example, 1-bit indication;
   switching of a parameter set of periodic reference signals or on-demand reference signals;
   the period of the periodic reference signal, which may be indicated by J bits, wherein the period may be at least one of a duration based on a time granularity and a relative time period based on a reference time point;
   a sending time position of the non-periodic reference signal, which may be indicated by K bits, wherein the sending time position may be at least one of a relative time and a time offset relative to a reference point;
   the RRC configuration period, wherein the periodic RRC index is indicated by the DCI;
5) indication of the terminal's discontinuous reception configuration;
   the discontinuous reception DRX configuration of the terminal includes the DRX cycle of the terminal, the time domain offset, the starting position of DRX, the duration of DRX reception, and the end time of DRX reception;
   optionally, the indication of the DRX configuration of the terminal includes switching of parameter sets indicating different DRX states of the terminal; the different DRX states of the terminal include at least one DRX state, for example, a first DRX state and a second DRX state, wherein the first DRX state may include a continuous reception state of DRX; the second DRX state may include a non-continuous reception state of DRX; wherein the first DRX state corresponds to a first parameter set, and the second DRX state corresponds to a second parameter set; here, the parameter set includes DRX parameters, wherein the DRX parameters may include at least one of the following: SSB, time-frequency tracking reference signal (Tracking reference signal, TRS), channel state indicator reference signal (CSI-RS), PDCCH monitoring indication signal, wake-up signal, search space configuration; here, the DRX of the terminal may be configured by the base station, wherein the configuration may be based on the RRC configuration, indicating an RRC index identifier of the DRX configuration of the terminal;

6) indication of discontinuous transmission configuration or discontinuous reception configuration of the base station;
   the discontinuous transmission (DTX) configuration of the base station includes: the period of discontinuous transmission of the base station, the time domain offset,
   the starting position of discontinuous transmission, the duration of discontinuous transmission, and the end time of discontinuous transmission;
   the DRX configuration of the base station includes: the period of discontinuous reception of the base station, the time domain offset, the starting position of the discontinuous reception, the duration of the discontinuous reception, and the end time of the discontinuous reception;
   optionally, the indication of the DTX configuration of the base station includes at least one of: indication to switching of a parameter set for different states of the DTX of the base station and switching of a parameter set for different states of the DRX of the base station;
   the different DTX states of the base station or the specific cell (CELL-specific) include at least one DTX state, for example, a first DTX state and a second DTX state; the first DTX state may include a continuous transmission state of DTX; the second DTX state may include a non-continuous transmission state of DTX; the first DTX state corresponds to a first parameter set; the second DTX state corresponds to a second parameter set; here, the parameter set includes DTX parameters, and the DTX parameters may include at least one of the following: SSB, TRS, CSI-RS, PDCCH monitoring indication signal, wake-up signal, and search space configuration;
   the different DRX states of the base station include at least one DRX state, for example, a first DRX state and a second DRX state; the first DRX state may include a continuous reception state of DRX; the second DRX state may include a non-continuous reception state of DRX; the first DRX state corresponds to a first parameter set; the second DRX state corresponds to a second parameter set; here, the parameter set includes DRX parameters, and the DRX parameters may include at least one of the following: a channel sounding reference signal (Sounding Reference Signal, SRS), a PDCCH monitoring indication signal, a wake-up signal, a search space configuration, and a physical random access channel (Physical Random Access Channel, PRACH);
   here, the DRX configuration on the base station side may be based on the RRC configuration, indicating the RRC index of the DRX configuration of the base station;
   the DTX configuration on the base station side may be based on the RRC configuration, indicating the RRC index of the DTX configuration of the base station;

7) indication of the energy-saving status of the base station
   optionally, the indication of the energy-saving state of the base station includes instructing the base station to configure at least one of an energy-saving state and a sleep state, which may be configured based on RRC;
   the energy-saving state includes at least one energy consumption state, and the sleep state includes at least one sleep mode; the energy-saving information indicates at least one of an RRC index of the energy-saving state and an RRC index of the sleep state.

Optionally, the frequency-domain energy-saving solution includes at least one of the following:

1) dynamic bandwidth adjustment indication for terminal groups;
   here, in the case where the base station configures the bandwidth or bandwidth part (BWP) of at least one terminal group, the dynamic bandwidth adjustment indication of the terminal group may indicate the bandwidth information or BWP information of the terminal group, which may be indicated by K bits, including indicating the number of resource blocks (RBs), the start identifier of the RB, the end identifier of the RB, the number of continuous RBs, and the BWP ID;
   when the base station configures the dynamic bandwidth and/or BWP adjustment information of the terminal group, the dynamic bandwidth adjustment indication of the terminal group can be indicated by the L bits, which can be based on RRC signaling, including the RRC index and the RRC bitmap identifier; the RRB index can be used to identify the bandwidth information and/or BWP information before adjustment, and the bandwidth information and/or BWP information after adjustment;
   when the base station configures a dedicated bandwidth and/or BWP for base-station energy-saving, the dynamic bandwidth adjustment indication of the terminal group can be indicated by M bits, wherein the bandwidth and/or BWP for base-station energy-saving are the bandwidth and/or BWP required for maintaining the basic requirement of a communication link; the energy-saving bandwidth and/or BWP includes at least one of the following: that the base station does not transmit data, that the base station transmits synchronization signals, and that the base station transmits time-frequency channel tracking signals;

2) on/off indication of dynamic cells under multi-carrier;
   the base station configures AA carriers, and the on/off indication of the dynamic cell under multiple carriers can indicate on/off of at least one carrier;
   the off of a carrier includes performing at least one of the following operations on the carrier: no signal/data transmission, transmission of a signal with a longer period than other carriers; the signal may include at least one of a synchronization signal, a time-frequency tracking signal, a SIB signal, and a cell discovery signal;
   the on of a carrier refers to the normal transmission of signals/channels on the carrier, which can be indicated by N bits; the on/off indication of a dynamic cell under multiple carriers can indicate the on/off on at least one carrier, and includes: whether to execute the on of a carrier, whether to execute the off of a carrier, parameter configuration of the off of the carrier, wherein the parameters include the period of the off of the carrier and the signal transmission period of the off of the carrier; parameter configuration of the on of the carrier, wherein the parameters include the period of the on of the carrier and the signal transmission period of the on of the carrier;

3) state indication of secondary cell;
    the base station configures AA carriers; the secondary cell may include at least one of a cell and a carrier; the cell may include an independent cell ID, or a cell ID shared with other cells;
    the state indication of the secondary cell may indicate the activation and/or deactivation of at least one carrier; it may be indicated by O bits, specifically indicating the activation and/or deactivation of the carrier; or, it may be indicated by P bits, specifically indicating at least one of the identifier of the activated carrier and the identifier of the deactivated carrier;

4) switching indication of a dynamic primary cell of a terminal group;
    the base station configures Pcell, and the switching indication of the dynamic primary cell of the terminal group can indicate the PCell parameter configuration through Q bits, and the PcCll parameters include the PCell identifier; the Q bits can indicate one of the following: activation and/or deactivation of PCell, identifier of activated and/or deactivated PCell; the Q bits can be an RRC index, a bitmap;

5) parameter set switching indication for different frequency domain states of the base station
    the different frequency domain states of the base station include at least one frequency domain state, for example, a first frequency domain state and a second frequency domain state; the first frequency domain state may include a frequency-domain energy-saving state of the base station; the second frequency domain state may include a frequency-domain non-energy-saving state of the base station; the first frequency domain state corresponds to a first parameter set, and the second frequency domain state corresponds to a second parameter set; the parameter set includes frequency domain parameters of the base station, where the frequency domain parameters of the base station may include at least one of the following: SSB, TRS, CSI-RS, PDCCH monitoring indication signal, wake-up signal, search space configuration.

Optionally, the spatial-domain energy-saving solution includes at least one of the following:

1) switching indication of the parameter set of the base-station spatial-domain unit parameters;
    the parameter set of the base-station spatial-domain unit parameter includes at least two parameter sets, for example, a first parameter set and a second parameter set. The first parameter set is used to indicate a first configuration of the base-station spatial-domain unit parameter; the second parameter set is used to indicate a second configuration of the base-station spatial-domain unit parameter;
    the switching indication of the parameter set of the base-station spatial-domain unit parameters may be used to indicate the switching between different parameter sets of the base-station spatial-domain unit parameters;

2) instructions for adjusting base-station spatial-domain unit parameters;
    optionally, the indications for adjusting the base-station spatial-domain unit parameters may indicate at least one of following: the switching of the number of spatial-domain units configured by the base station, the spatial-domain unit identifier, and the parameter set of the number of spatial-domain units configured by the base station;
    here, the spatial-domain units include at least one of the following: an antenna unit, a transceiver unit, an antenna panel unit, and an antenna port unit; the number of spatial-domain units can be identified by R bits, for example, 6 bits indicate the number of antenna ports; the spatial-domain unit can be identified by R bits, for example, 8 bits identify 256 antenna units;

3) indication of reference signal configuration;
    the reference signal configuration includes at least one of the following: SSB parameter configuration, phase tracking reference signal (Phase-Tracking Reference Signals, PT-RS) parameter configuration;
    the SSB parameters include the number of SSBs, cycle, transmission configuration indicator (Transmission Configuration Indicator, TCI), and port power configuration;
    the CSI-RS port configuration includes the number of CSI-RS ports, port time-domain and frequency-domain configuration, port power configuration, and period;
    TRS parameter configuration includes period, time-domain and frequency-domain resource configuration, and port power configuration;
    the configuration indication of the reference signal may indicate switching between different parameter sets of the reference signal;
    here, the different parameter sets of the reference signal include at least two parameter sets, and the parameter sets include the configuration of the above parameters;

4) a joint indication of a first spatial-domain unit parameter and a reference signal configuration, wherein the first spatial-domain unit parameter includes the number of spatial-domain units or the spatial-domain unit index;
    for example, a joint indication of the Transmitter Receiver Point (TRP) index and the CSI-RS port configuration
    □→100: TRP0→CSI-RS port16;
    □→001: TRP0→CSI-RS port 8;
    further, the joint indication of the first spatial-domain unit parameter and the reference signal configuration may indicate switching between parameter sets of the joint indication of the number of spatial-domain units and the reference signal configuration; the parameter sets of the joint indication of the number of spatial-domain units and the reference signal configuration include at least two parameter sets, for example, a first parameter set and a second parameter set; the first parameter set corresponds to a first parameter set for a joint indication of the number of spatial-domain units and the reference signal configuration; the second parameter set corresponds to a second parameter set of the joint indication of the number of the spatial-domain units and reference signal configuration;

5) channel state information reference signal CSI-RS measurement or reporting configuration;

further, the channel state information reference signal CSI-RS measurement or reporting configuration may indicate switching between parameter sets of the CSI-RS measurement/reporting configuration; the parameter sets of the CSI-RS measurement/reporting configuration include at least two parameter sets, for example, a first parameter set and a second parameter set; the first parameter set corresponds to the first parameter set of the CSI-RS measurement/reporting configuration; the second parameter set corresponds to the second parameter set of the CSI-RS measurement/reporting configuration;

6) indication of dynamically adjusting a power the indication of dynamically adjusting a power includes at least one of following: an indication of dynamically adjusting the transmit power of the base station and an indication of switching between parameter sets of power parameter configuration;

the indication of dynamically adjusting the transmit power of the base station includes a power adjustment indication of a DL channel/signal, and the DL channel/signal includes a PDCCH channel, a PDSCH channel, a CSI-RS reference signal, a TRS reference signal, and an SSB signal; the indication of adjusting the transmit power of the base station includes at least one of an adjustment of the maximum transmit power on a given frequency band and an adjustment of the power spectrum density on a given frequency band;

the parameter set of the power parameter configuration includes at least two parameter sets, for example, a first parameter set and a second parameter set; the first parameter set corresponds to the first parameter set of the power parameter configuration; the second parameter set corresponds to the second parameter set of the power parameter configuration.

Optionally, the power-domain energy-saving solution includes at least one of the following:

transmit power of the first information; an offset value of the transmit power of the first information relative to the reference power; an indication of whether the transmit power of the first information is zero.

The first information includes at least one of a target signal, a target channel, a target time resource, a target frequency-domain resource, and a target spatial-domain resource.

The reference power is the transmit power of at least one of a reference signal, a reference channel, a reference time-domain resource, a reference frequency-domain resource, and a reference spatial-domain resource.

The target signal includes at least one of a synchronization signal, a channel state indication signal, a time-frequency tracking signal, a phase tracking signal, and a positioning signal.

The target channel includes at least one of a control channel, a traffic channel, a physical channel, and a logical channel.

The target time resource includes an indicated time resource, wherein the indicated time resource includes at least one of a predefined time resource, a time resource configured by a radio resource control (RRC), and a time resource dynamically indicated;

The target frequency-domain resource includes an indicated frequency-domain resource, and the indicated frequency-domain resource includes at least one of a predefined frequency-domain resource, a frequency-domain resource configured by a radio resource control (RRC), and a frequency-domain resource dynamically indicated.

The target spatial-domain resource includes an indicated spatial-domain resource, and the indicated spatial-domain resource includes at least one of a predefined spatial-domain resource, a spatial-domain resource configured by a radio resource control (RRC), and a spatial-domain resource dynamically indicated.

The reference signal includes at least one of a synchronization signal, a channel state indication signal, a time-frequency tracking signal, a phase tracking signal, and a positioning signal.

The reference channel includes at least one of a control channel, a traffic channel, a physical channel, and a logical channel.

The reference time-domain resource includes an indicated time resource, wherein the indicated time resource includes at least one of a predefined time resource, a time resource configured by a radio resource control (RRC), and a time resource dynamically indicated.

The reference frequency-domain resource includes an indicated frequency-domain resource, and the indicated frequency-domain resource includes at least one of a predefined frequency-domain resource, a frequency-domain resource configured by a radio resource control (RRC), and a frequency-domain resource dynamically indicated.

The reference spatial-domain resources include indicated spatial-domain resources, and the indicated spatial-domain resources include at least one of a predefined spatial-domain resource, a spatial-domain resource configured by a radio resource control (RRC), and a spatial-domain resource dynamically indicated.

Optionally, other energy-saving solutions include at least one of the following: a power amplifier coefficient adjustment solution; a peak to average power ratio reduction solution.

The disclosed embodiment of the present disclosure increases the flexibility of indication of the base-station energy-saving information by jointly indication of dynamic signaling and all the information of indicating the energy-saving of the base station, and can further reduce the energy consumption of the base station and save the signaling overhead of the base station through the method of joint indication of dynamic signaling.

In an optional implementation, before step 101, the method of the embodiment of the present disclosure may further include:

configuring at least one base-station energy-saving RNTI;

scrambling a first instruction according to the at least one base-station energy-saving RNTI, and obtaining the dynamic signaling;

wherein the at least one base-station energy-saving RNTI is used to indicate at least one of the following:

grouping of energy-saving information types;

grouping at the level of a group of terminals;

grouping at the cell level and the level of a group of terminals;

grouping at the cell level and the terminal level;

grouping at the level of a group of terminals and the terminal level;

grouping of information contents of energy-saving information types.

Optionally, the first instruction is DCI.

In this implementation, at least one base-station energy-saving RNTI is configured to scramble the DCI to obtain the scrambled DCI.

Here, at least one base-station energy-saving RNTI is used to identify group information. The group information includes the group indicated by the at least one base-station energy-saving RNTI.

The grouping of energy-saving information type includes at least one of grouping of time-domain energy-saving information, grouping of frequency-domain energy-saving information, grouping of spatial-domain energy-saving information, grouping of a power-domain energy-saving information, and grouping of other energy-saving information. Examples are as follows:

TABLE 1

Example 1 of different base-station energy-saving RNTI group identifiers

| Base-station energy-saving RNTI group identifiers | Meaning of identifiers |
|---|---|
| Group 1 | Time-domain energy-saving information |
| Group 2 | Frequency-domain energy-saving information |
| Group 3 | Spatial-domain energy-saving information |
| Group 4 | Power-domain energy-saving information |
| Group 5 | Other energy-saving Information |

The grouping at a level of a group of terminals includes grouping of base-station energy-saving information of different terminal groups, and an example is as follows:

TABLE 2

Example 2 of different base-station energy-saving RNTI group identifiers

| Base-station energy-saving RNTI group identifiers | Meaning of identifiers |
|---|---|
| Group 1 | Base-station energy-saving information for terminal group 1 |
| Group 2 | Base-station energy-saving information for terminal group 2 |
| Group 3 | Base-station energy-saving information for terminal group 3 |
| Group x | Base-station energy-saving information for terminal group x |

The grouping at the cell level and at the level of a group of terminals includes grouping of the base-station energy-saving information of the cell and grouping of the base-station energy-saving information of different terminal groups, as shown in the following example:

TABLE 3

Example 3 of different base-station energy-saving RNTI group identifiers

| Base-station energy-saving RNTI group identifiers | Meaning of identifiers |
|---|---|
| Group 1 | Cell-specific base-station energy-saving information |
| Group 2 | Base-station energy-saving information for terminal group 1 |
| Group 3 | Base-station energy-saving information for terminal group 2 |
| Group x | Base station energy-saving information for terminal group x |

The grouping at the cell level, level of a group of terminals and terminal level include grouping of the base-station energy-saving information of the cell, grouping of the base-station energy-saving information of different terminal groups and grouping of the base-station energy-saving information of different terminals, and the examples are as follows:

TABLE 4

Example 4 of different base-station energy-saving RNTI group identifiers

| Base-station energy-saving RNTI group identifiers | Meaning of identifiers |
|---|---|
| Group 1 | Cell-specific base-station energy-saving information |
| Group 2 | Base-station energy-saving information for terminal group 1 |
| Group 3 | Base-station energy-saving information for terminal group 2 |
| Group x | Base-station energy-saving information for terminal group x |
| Group x + 1 | Base-station energy-saving information of terminal 1 |
| Group x + 2 | Base-station energy-saving information of terminal 2 |
| Group x + n | Base-station energy-saving information of terminal n |

The grouping of the information content of the energy-saving information types includes grouping of different information content of each energy-saving information type in different energy-saving information types. An example is as follows:

TABLE 5

Example 5 of different base-station energy-saving RNTI group identifiers

| RNTI Grouping | Identifiers |
|---|---|
| RNTI-1 | Time-domain base-station energy-saving information 1 |
| RNTI-2 | Time-domain base-station energy-saving information 2 |
| RNTI-x | Time-domain base-station energy-saving information x |
| RNTI-x + 1 | Frequency-domain base-station energy-saving information 1 |
| RNTI-x + 2 | Frequency-domain base-station energy-saving information 2 |
| RNTI-x + n | Frequency-domain base-station energy-saving information |
| . . . | . . . |
| RNTI-x + n + k | Spatial-domain base-station energy-saving information k |
| RNTI-x + n + m | Spatial-domain base-station energy-saving information m |

In an optional implementation, the dynamic signaling is used to indicate base-station energy-saving information of at least one terminal group; the base-station energy-saving information of each terminal group includes at least one of energy-saving information of a time domain, energy-saving information of a frequency domain, energy-saving information of a spatial domain, energy-saving information of a power domain, and other energy-saving information.

The implementation method is specifically described below through Example 1.

Example 1

In this embodiment, the dynamic signaling is the first DCI. The specific steps of the information transmission method are as follows.

Step 11: the base station configures a first DCI scrambled by at least one base-station energy-saving RNTI, wherein the first DCI is used to indicate base-station energy-saving information of at least one UE group.

Further, the base-station energy-saving information of each group of UE groups includes at least one of energy-saving information of a time domain, energy-saving information of a frequency domain, energy-saving information of a spatial domain, energy-saving information of a power domain, and other energy-saving information, the energy-saving information of a time domain includes energy-saving information of at least one time-domain energy-saving solution; the energy-saving information of a frequency domain includes energy-saving information of at least one frequency-domain energy-saving solution; the energy-saving information of a spatial domain includes energy-saving information of at least one spatial domain energy-saving solution; the energy-saving information of a power domain includes energy-saving information of at least one power-domain energy-saving solution; and other energy-saving information includes energy-saving information of at least one another energy-saving solution.

An example diagram of the indication format of the first DCI scrambled by the base-station energy-saving RNTI of this implementation method is shown in FIG. 2.

In this embodiment, the first DCI is used to indicate the base-station energy-saving information of UE-group1, UE-group-2, UE-group-i, and UE-group-N, wherein the indicated base-station energy-saving information of each UE-group includes energy-saving information of a time domain, energy-saving information of a frequency domain, energy-saving information of a spatial domain, energy-saving information of a power domain, and other energy-saving information. The energy-saving information of a time domain under UE-group-2 includes energy-saving information of at least one energy-saving solution of the energy-saving domain, such as information 1 and information 2. Of course, the energy-saving information of other energy-saving domains under the UE-group-2 includes similar contents, and the energy-saving information of energy-saving domains under other UE-groups also includes similar contents.

It should be noted that at least one base-station energy-saving RNTI is used to identify the group information. The specific description of at least one base-station energy-saving RNTI identifying the group information can be found in the corresponding implementation method before step 101, which will not be repeated here.

Step 12: the base station sends a first DCI.

Specifically, the base station sends the first DCI on the corresponding first DCI transmission resources.

Here, the first DCI is carried on the PDCCH channel.

In another optional implementation, the dynamic signaling is used to indicate at least one of energy-saving information of a time domain, energy-saving information of a frequency domain, energy-saving information of a spatial domain, energy-saving information of a power domain, and other energy-saving information.

The energy-saving information of each energy-saving domain includes energy-saving information for at least one terminal group of the energy-saving domain, and the energy-saving information of each terminal group includes energy-saving information of at least one energy-saving solution of the energy-saving domain, and the energy-saving domain includes one of the time domain, the frequency domain, the spatial domain, the power domain, and the another domain other than the time domain, the frequency domain, the spatial domain, and the power domain.

The implementation method is specifically described below through Example 2.

Example 2

In this embodiment, the dynamic signaling is the first DCI. The specific steps of the information transmission method are as follows.

Step 21: the base station configures a first DCI scrambled by at least one base-station energy-saving RNTI, where the first DCI is used to indicate at least one of energy-saving information of a time domain, energy-saving information of a frequency domain, energy-saving information of a spatial domain, energy-saving information of a power domain, and other energy-saving information.

The energy-saving information of each energy-saving domain includes energy-saving information of at least one UE group in the energy-saving domain, and the energy-saving information of each UE group includes energy-saving information of at least one energy-saving solution of the energy-saving domain.

Figure 3:
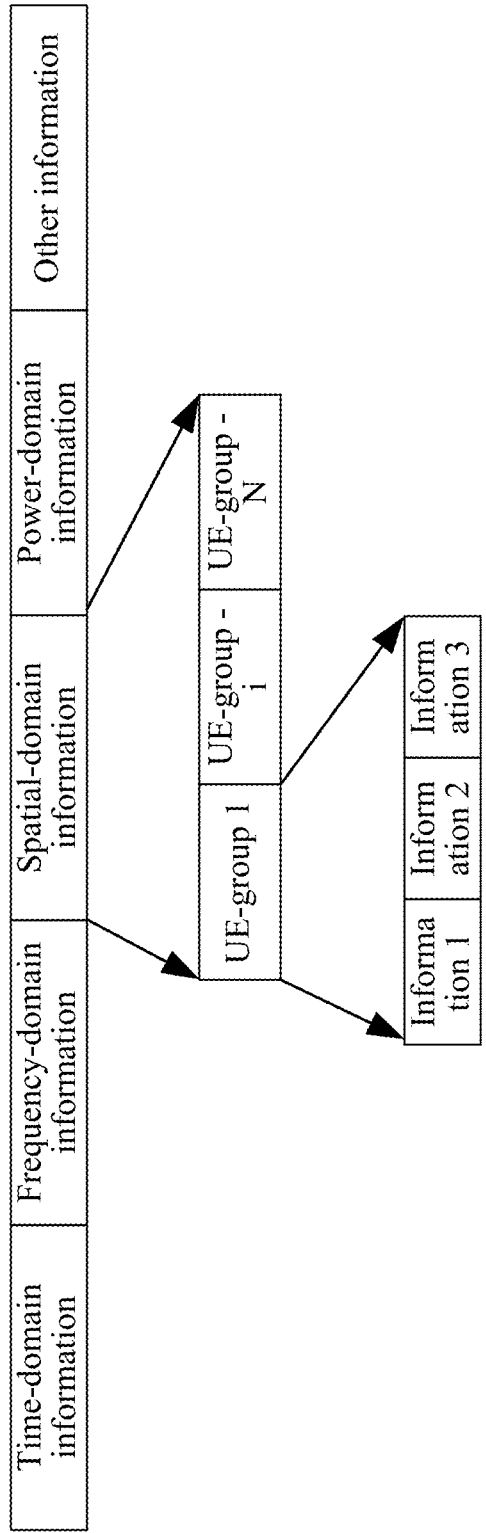
FIG. 3 is a second example diagram of an indication format of first DCI scrambled by an energy-saving RNTI of a base station according to an embodiment of the present disclosure.

FIG. 3 shows an example diagram of the indication format of the first DCI scrambled by the base-station energy-saving RNTI of this embodiment. The energy-saving information of a spatial domain indicated in this embodiment (spatial-domain information in the figure) includes energy-saving information of UE-group1, UE-group-i, and UE-group-N in the spatial-domain, and the energy-saving information of each UE-group includes energy-saving information of the at least one energy-saving solution of the energy-saving domain, such as information 1, information 2, and information 3. Of course, the indicated energy-saving information of other energy-saving domains also includes energy-saving information of UE-group1, UE-group-i, and UE-group-N in the corresponding energy-saving domain, and the energy-saving information of each UE-group includes energy-saving information of the at least one energy-saving solution of the energy-saving domain.

It should be noted that at least one base-station energy-saving RNTI is used to identify the group information. The specific description of at least one base-station energy-saving RNTI identifying the group information can be found in the corresponding implementation method before step 101, which will not be repeated here.

Step 22: the base station sends a first DCI.

Specifically, the base station sends the first DCI on the corresponding first DCI transmission resources.

Here, the first DCI is carried on the PDCCH channel.

In yet another optional implementation, the dynamic signaling is used to indicate at least one of the following: energy-saving information of at least one time-domain energy-saving solution; energy-saving information of at least one frequency-domain energy-saving solution; energy-saving information of at least one spatial-domain energy-saving solution; energy-saving information of at least one power-domain energy-saving solution; energy-saving information for at least one another energy-saving solution.

The energy-saving information of each energy-saving solution includes energy-saving information of at least one terminal group, and the energy-saving domain corresponding to the energy-saving information of at least one terminal group is the same as the energy-saving domain corresponding to the energy-saving information of the energy-saving solution, and the energy-saving domain includes at least one of the time domain, the frequency domain, the spatial domain, the power domain, and domains other than the time domain, the frequency domain, the spatial domain, and the power domain.

The implementation method is specifically described below through Example 3.

Example 3

In this embodiment, the dynamic signaling is the first DCI. The specific steps of the information transmission method are as follows.

Step 31: the base station configures at least one first DCI scrambled by the base-station energy-saving RNTI, where the first DCI is used to indicate at least one of the following:
- energy-saving information of at least one time-domain energy-saving solution;
- energy-saving information of at least one frequency-domain energy-saving solution;
- energy-saving information for at least one spatial-domain energy-saving solution;
- energy-saving information of at least one power-domain energy-saving solution;
- energy-saving information for at least one other energy-saving solution.

The energy-saving information of each energy-saving solution includes energy-saving information of at least one UE group. For example, the energy-saving information of a time-domain energy-saving solution includes energy-saving information of at least one UE group in the time domain. The energy-saving information of a frequency-domain energy-saving solution includes energy-saving information of at least one UE group in the frequency domain.

In this embodiment, the energy-saving information of the time-domain energy-saving solution includes time domain information 1 and time domain information 2; the energy-saving information of the frequency-domain energy-saving solution includes frequency domain information 1 and frequency domain information 2, the energy-saving information of the spatial domain energy-saving solution includes spatial domain information 1 and spatial domain information 2, the energy-saving information of the power-domain energy-saving solution includes power domain information 1 and power domain information 2, and the energy-saving information of another energy-saving solutions includes other information.

Figure 4:
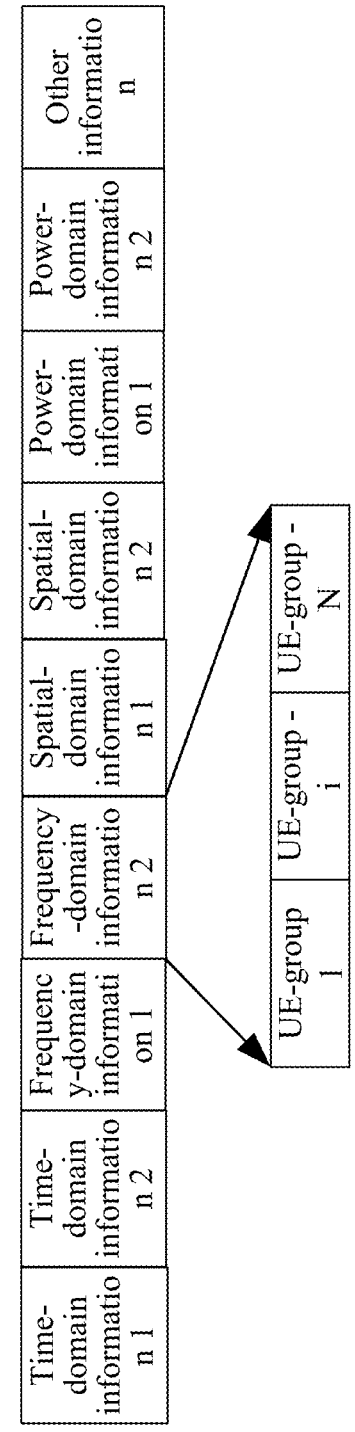
FIG. 4 is a third example diagram of an indication format of first DCI scrambled by an energy-saving RNTI of a base station according to an embodiment of the present disclosure.

Referring to FIG. 4, in this embodiment, the frequency domain information 2 includes energy-saving information corresponding to at least one terminal group in the frequency domain, and specifically, the terminal groups include UE-group1, UE-group-i, and UE-group-N. Of course, energy-saving information of energy-saving solutions in other energy-saving domains, such as time domain information 1, spatial domain information 1, etc., also include energy-saving information corresponding to at least one terminal group in the energy-saving domain.

It should be noted that at least one base-station energy-saving RNTI is used to identify the group information. The specific description of at least one base-station energy-saving RNTI identifying the group information can be found in the corresponding implementation method before step 101, which will not be repeated here.

An example diagram of the indication format of the first DCI scrambled by the base-station energy-saving RNTI in this implementation method is shown in FIG. 4.

Step 32: the base station sends a first DCI.

Specifically, the base station sends the first DCI on the corresponding first DCI transmission resources.

Here, the first DCI is carried on the PDCCH channel.

In yet another optional implementation, the dynamic signaling is used to indicate at least one of the following:
- energy-saving information of at least one time-domain energy-saving solution;
- energy-saving information of at least one frequency-domain energy-saving solution;
- energy-saving information of at least one spatial-domain energy-saving solution;
- energy-saving information of at least one power-domain energy-saving solution;
- energy-saving information of at least one another energy-saving solution.

The energy-saving information of each energy-saving solution includes at least one of the cell-level energy-saving information, the terminal-group-level energy-saving information, and the terminal-level energy-saving information corresponding to the energy-saving information of the energy-saving solution. The energy-saving domain includes one of the time domain, the frequency domain, the spatial domain, the power domain, and the another domain other than the time domain, the frequency domain, the spatial domain, and the power domain.

The implementation method is specifically described below through Example 4.

Example 4

Step 41: the base station configures first DCI scrambled by at least one base-station energy-saving RNTI, where the first DCI is used to indicate at least one of the following:
- energy-saving information of at least one time-domain energy-saving solution;
- energy-saving information of at least one frequency-domain energy-saving solution;
- energy-saving information of at least one spatial-domain energy-saving solution;
- energy-saving information of at least one power-domain energy-saving solution;
- energy-saving information of at least one other energy-saving solution.

The energy-saving information of each energy-saving solution includes at least one of the energy-saving information of the energy-saving domain corresponding to the energy-saving solution, the cell-level energy-saving information, the terminal-group-level energy-saving information and the terminal-level energy-saving information.

In this embodiment, the indicated energy-saving information of the time-domain energy-saving solution includes time domain information 1 and time domain information 2; the indicated energy-saving information of the frequency-domain energy-saving solution includes frequency domain information 1 and frequency domain information 2; the indicated energy-saving information of the spatial domain energy-saving solution includes spatial domain information 1 and spatial domain information 2; the indicated energy-saving information of the power-domain energy-saving solution includes power domain information 1 and power domain information 2; and the indicated energy-saving information of other energy-saving solutions includes other information.

In this embodiment, the frequency domain information 2 includes energy-saving information at the level of a group of terminals corresponding to the frequency domain, and specifically, the terminal groups include UE-group 1, UE-group-i, and UE-group-N. Of course, energy-saving information of other energy-saving domains may correspond to cell-level energy-saving information or terminal-level energy-saving information.

It should be noted that at least one base-station energy-saving RNTI is used to identify the group information. The specific description of at least one base-station energy-saving RNTI identifying the group information can be found in the corresponding implementation method before step 101, which will not be repeated here.

An example diagram of the indication format of the first DCI scrambled by the base-station energy-saving RNTI of this implementation method is shown in FIG. 5.

Step 42: the base station sends a first DCI.

Specifically, the base station sends the first DCI on the corresponding first DCI transmission resources.

Here, the first DCI is carried on the PDCCH channel.

In an optional implementation, the dynamic signaling includes a first bit field identifier, and the energy-saving information of energy-saving solutions in different energy-saving domains is indicated by the first bit field identifier.

Here, in the case where the dynamic signaling includes the first bit field identifier, the energy-saving information of each energy-saving solution of each energy-saving domain has the first bit field identifier for indication; or the dynamic signaling includes a second bit field identifier and a radio resource control RRC identifier, and the energy-saving information of energy-saving solutions in different energy-saving domains is jointly indicated by the second bit field identifier and the RRC identifier.

The following is specifically described by Example 5.

Example 5

Step 51: the base station configures first DCI scrambled by at least one base-station energy-saving RNTI, where the first DCI is used to indicate the base-station energy-saving information of at least one UE group.

The DCI includes at least one RRC identifier of each UE group, and each RRC identifier is used to identify at least one of energy-saving information of a time domain, energy-saving information of a frequency domain, energy-saving information of a spatial domain, energy-saving information of a power domain, and other energy-saving information.

An example diagram of the indication format of the first DCI scrambled by the base-station energy-saving RNTI in this embodiment is shown in FIG. 6.

Specifically, examples of information indication in the time, frequency, spatial and power domains are shown in the following table; wherein each RRC identifier jointly indicates at least one energy-saving information of energy-saving solutions of the time domain, the frequency domain, the spatial domain, the power domain, and another domain.

TABLE 6

Example of information indications of the time domain, the frequency domain, the spatial domain, the power domain, and another domain.

| RRC identifier | Bit field identifier | Time-domain energy-saving information | Frequency-domain energy-saving information | Spatial-domain Energy-saving Information | Power-domain energy-saving information | Energy-saving information of another energy-saving solution |
|---|---|---|---|---|---|---|
| index1 | 0000 | Time domain information 1 | Frequency domain information 1 | Spatial-domain information 1 | Power domain information 1 | Other information 1 |
| index2 | 0001 | 0 | Frequency domain information 2 | Spatial-domain information 2 | Power domain information 2 | Other information 2 |
| index3 | 0010 | 0 | 0 | Spatial-domain information 3 | Power domain information 3 | Other information 3 |
| index-k | 1000 | Time domain information k | Frequency domain information k | Spatial-domain information k | Power domain information k | Other information k |

Step 52: the base station sends a first DCI.

Specifically, the base station sends the first DCI on the corresponding first DCI transmission resources.

Here, the first DCI is carried on the PDCCH channel.

Optionally, the dynamic signaling includes bit information representing units of the time domain, the frequency domain, and the spatial domain, and the energy-saving information of energy-saving solutions in different energy-saving domains is indicated by the bit information, and the energy-saving domain includes one of the time domain, the frequency domain, the spatial domain, the power domain, and the another domain other than the time domain, the frequency domain, the spatial domain, and the power domain.

The following is specifically described by Example 6:

Example 6

Step 61: the base station configures first DCI scrambled by at least one base-station energy-saving RNTI; wherein a joint indication of DCI and the energy-saving solution using time-frequency-spatial-domain resources is adopted.

Figure 7:
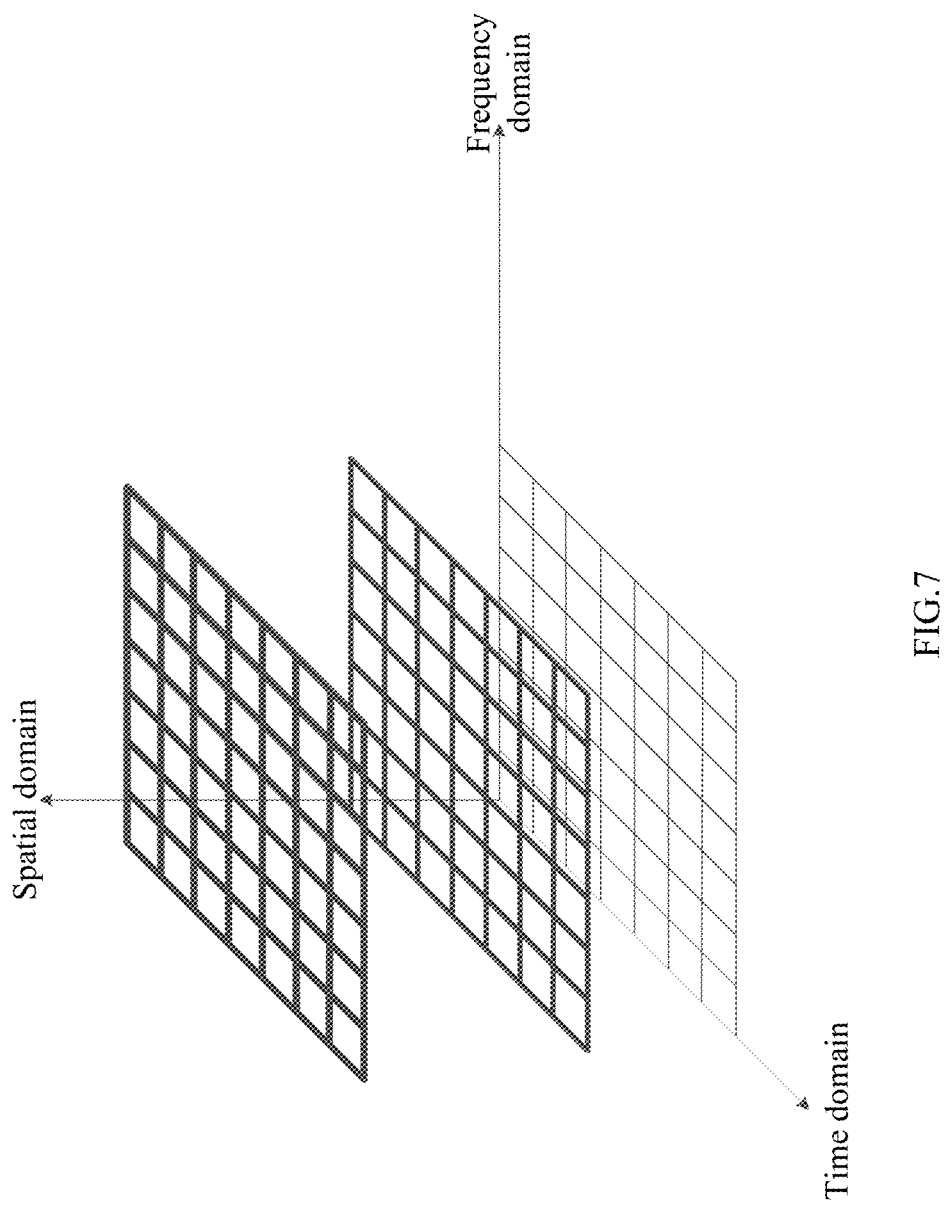
FIG. 7 is a sixth example diagram of an indication format of first DCI scrambled by an energy-saving RNTI of a base station according to an embodiment of the present disclosure.

An example diagram of the indication format of the first DCI scrambled by the base-station energy-saving RNTI in this embodiment is shown in FIG. 7.

Each grid in FIG. 7 represents a unit in the time domain, the frequency domain, and the spatial domain, and the unit in the time domain, the frequency domain, and the spatial domain can be a resource element group (REG), a resource block group (RBG), an orthogonal frequency division multiplexing (OFDM) symbol group, a slot group, etc.

Figure 8:
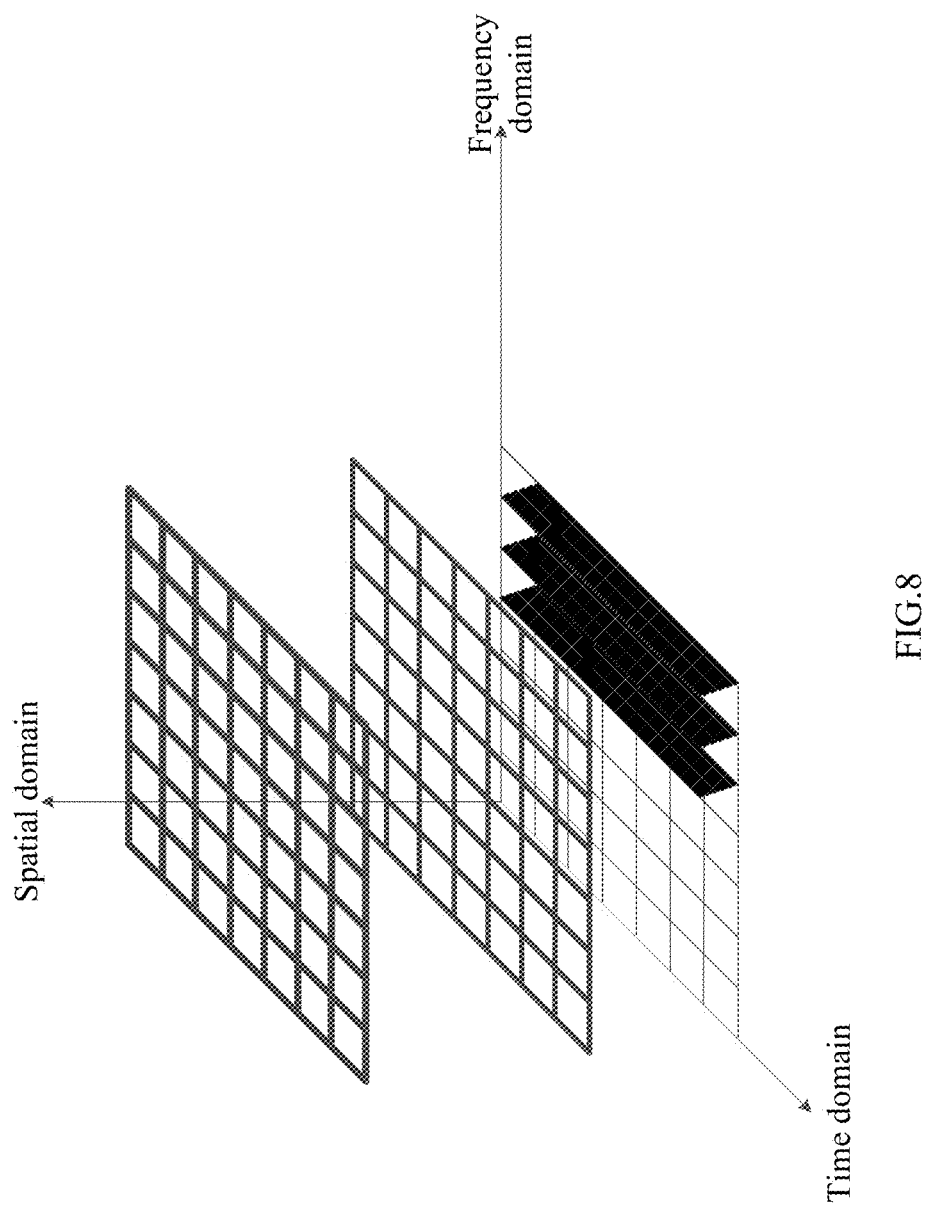
FIG. 8 is a schematic diagram of a time-domain energy-saving indication method based on FIG. 7.

Time-domain energy-saving: time domain off, the corresponding time domain unit is turned off, that is, no power is transmitted, or the transmit power is zero, see FIG. 8, which is a schematic diagram of the time-domain energy-saving indication method.

Figure 9:
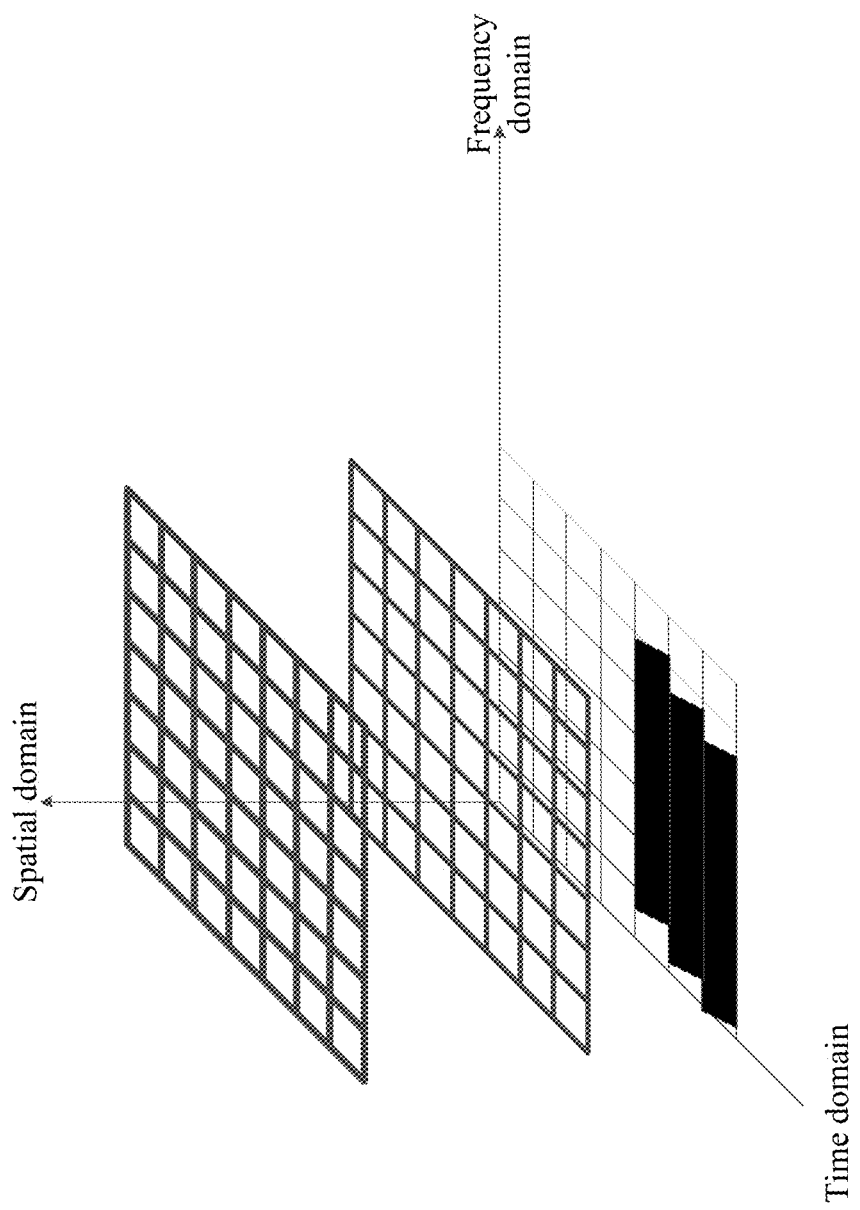
FIG. 9 is a schematic diagram of a frequency-domain energy-saving indication method based on FIG. 7.

Frequency-domain energy-saving: frequency domain adjustment, the corresponding frequency domain unit is turned off, no power is transmitted, or the transmit power is zero, see FIG. 9, which is a schematic diagram of the frequency-domain energy-saving indication method.

Figure 10:
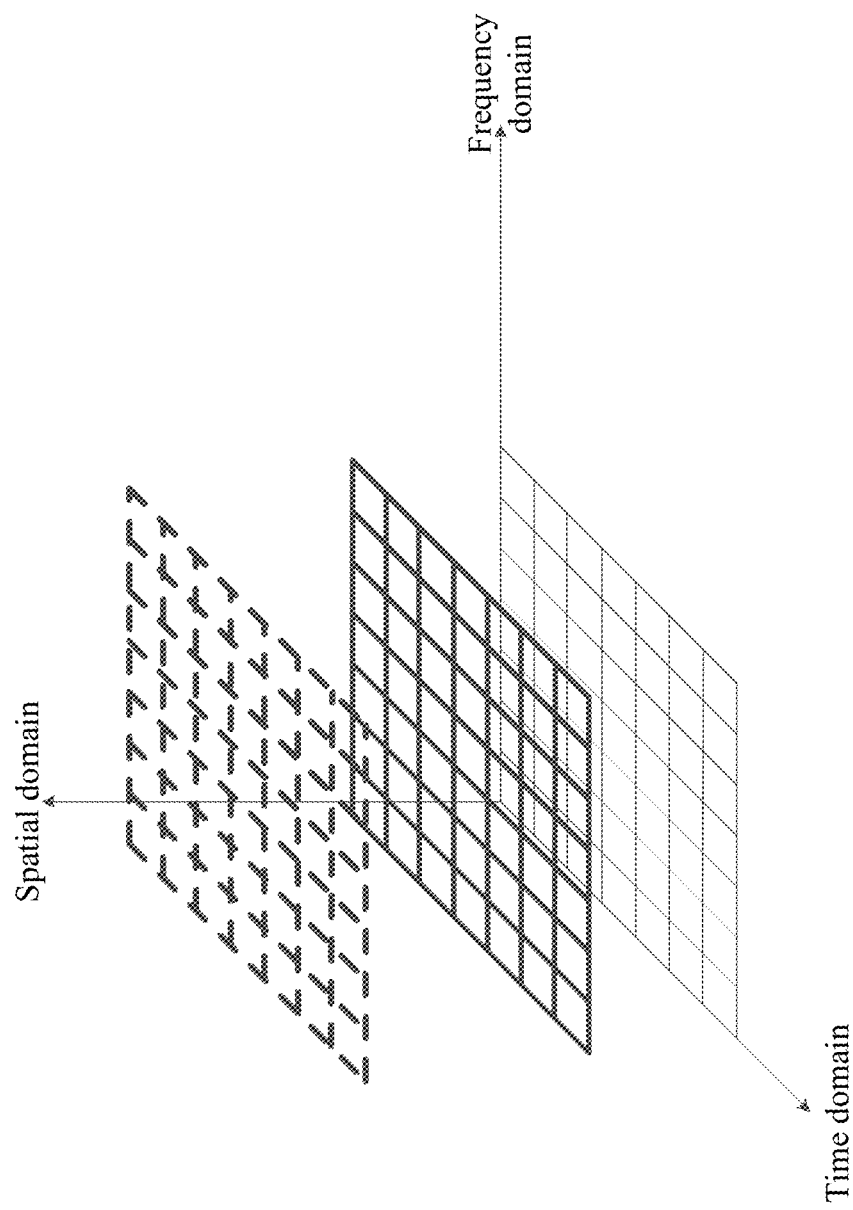
FIG. 10 is a schematic diagram of an spatial-domain energy-saving indication method based on FIG. 7.

Spatial-domain energy-saving: spatial-domain adjustment, the corresponding spatial-domain resources are turned off, no power is transmitted, or the transmit power is zero, see FIG. 10, which is a schematic diagram of the spatial-domain energy-saving indication method.

Power-domain energy-saving: each grid is configured with different powers to indicate the transmit powers in the time domain, the frequency domain, and the spatial domain.

Step 62: the base station sends a first DCI.

Specifically, the base station sends the first DCI on the corresponding first DCI transmission resources.

Here, the first DCI is carried on the PDCCH channel.

In an optional implementation, the dynamic signaling includes a third bit field identifier, and the third bit field identifier is used to indicate whether the energy-saving information of different energy-saving solutions of the energy-saving domains is updated.

When the third bit field identifier indicates that there is an update to the energy-saving information of the energy-saving solution of the target energy-saving domain in different energy-saving domains, the bit field identifier corresponding to the energy-saving information of the energy-saving solution of the target energy-saving domain is used to indicate the updated energy-saving information, and the energy-saving domain includes one of the time domain, the frequency domain, the spatial domain, the power domain, and the another domain other than the time domain, the frequency domain, the spatial domain, and the power domain.

The following is specifically described by Example 7.

Example 7

Step 71: the base station configures first DCI scrambled by at least one base-station energy-saving RNTI, where the first DCI is used to indicate base-station energy-saving information.

It should be noted that the update cycles of updating energy-saving information of the time domain, the frequency domain, the spatial domain, the power domain, and another energy-saving solutions may be different. A bit identifier (third bit field identifier) can be used to indicate whether the energy-saving information of the time domain, the frequency domain, the spatial domain, the power domain, and another energy-saving solutions is updated; if there is an update, the corresponding bit field identifier is further used to indicate the updated content under the corresponding energy-saving domain where the update exists.

Figure 11:
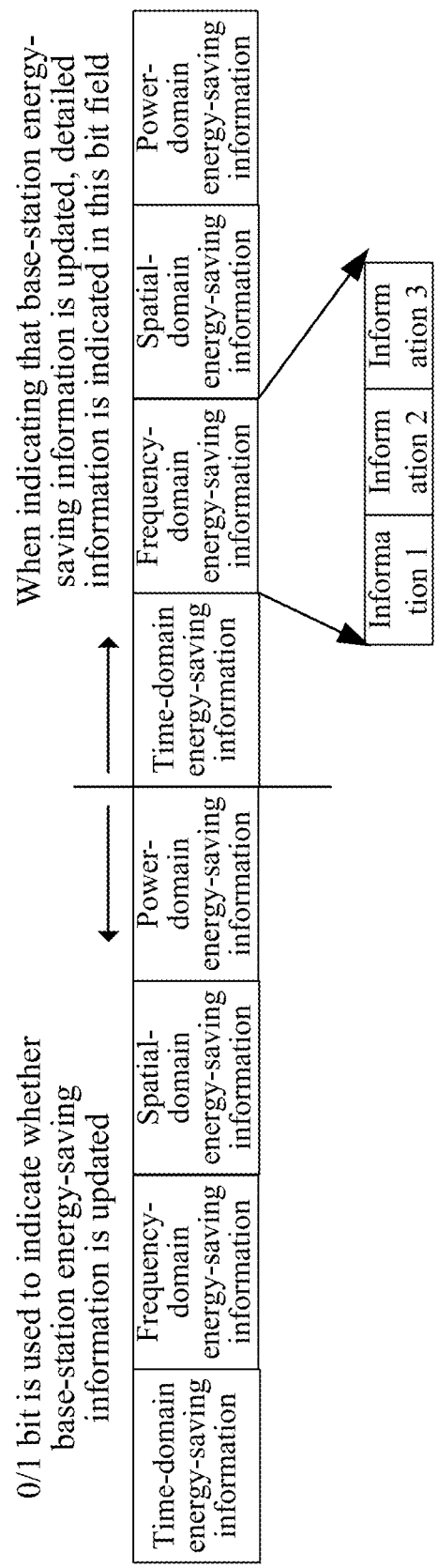
FIG. 11 is a first schematic diagram of indication information updating in first DCI scrambled by an energy-saving RNTI of a base station according to an embodiment of the present disclosure.

Referring to FIG. 11, the left side of the vertical line in the figure indicates the indication format of the DCI before updating, and the right side of the vertical line indicates the indication format of the DCI after updating.

Specifically, a bit 0 or 1 can be used to indicate whether the energy-saving information is updated; when it is indicated that there is an update of the energy-saving information, for example, in this embodiment, a bit identifier is used to indicate that there is an update to the energy-saving information of a frequency domain, then detailed information is indicated in the bit field corresponding to the energy-saving information of a frequency domain, that is, the updated content is indicated by the bit field identifier.

Step 72: the base station sends a first DCI.

Specifically, the base station sends the first DCI on the corresponding first DCI transmission resources.

Here, the first DCI is carried on the PDCCH channel.

Further, the dynamic signaling further includes a fourth bit field identifier, and the fourth bit field identifier is used to indicate whether at least one of the base-station energy-saving information at a cell level, the base-station energy-saving information at a level of a group of terminals, and the base-station energy-saving information at a terminal level is updated;

When the fourth bit field identifier indicates that there is an update to the base-station energy-saving information at a target level, and the third bit field identifier corresponding to the base-station energy-saving information at the target level indicates that there is an update to the energy-saving information of the energy-saving solution of the target energy-saving domain, the bit field identifier corresponding to the energy-saving information of the energy-saving solution of the target energy-saving domain contained in the base-station energy-saving information at the target level is used to indicate the updated energy-saving information.

The following is specifically described by Example 8:

Example 8

Step 81: the base station configures a first DCI scrambled by at least one base-station energy-saving RNTI, where the first DCI is used to indicate base-station energy-saving information of at least one UE group.

A bit identifier (fourth bit field identifier) can be used to determine whether the base-station energy-saving information of the terminal group is updated; if there is an update, the bit identifier (third bit field identifier) is further used under the corresponding terminal group where the update exists, to determine which specific energy-saving solution of a specific energy-saving domain in the energy-saving information of the time domain, the frequency domain, the spatial domain, the power domain, and another energy-saving solutions has the updated energy-saving information, and the corresponding bit field identifier is used under the energy-saving domain where the update exists to indicate the updated content.

Figure 12:
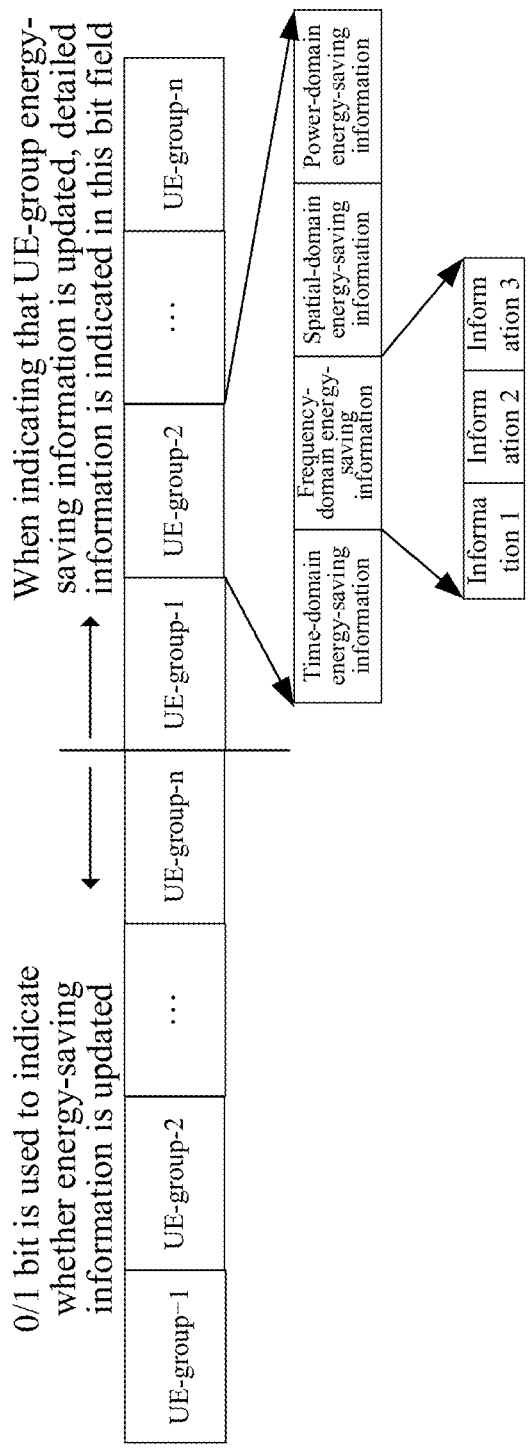
FIG. 12 is a second schematic diagram of indication information updating in first DCI scrambled by an energy-saving RNTI of a base station according to an embodiment of the present disclosure.

Referring to FIG. 12, the left side of the vertical line in the figure indicates the indication format of the DCI before updating, and the right side of the vertical line indicates the indication format of the DCI after updating.

Specifically, a bit 0 or 1 can be used to indicate whether the base-station energy-saving information of the UE-group is updated. In the embodiment, it indicates that the base-station energy-saving information of UE-group-2 is updated. The detailed information is indicated in the bit field corresponding to UE-group-2, that is, the bit identifier is used to indicate which energy-saving information of a specific energy-saving domain is updated. For example, in the embodiment, the bit identifier is used to indicate that the energy-saving information of a frequency domain is updated. Furthermore, the updated content of the energy-saving information of a frequency domain is indicated by the bit field identifier.

Step 82: the base station sends a first DCI.

Specifically, the base station sends the first DCI on the corresponding first DCI transmission resources.

Here, the first DCI is carried on the PDCCH channel; or when the third bit field identifier indicates that there is an update to the energy-saving information of the energy-saving solution of the target energy-saving domain, and the fourth bit field identifier indicates that there is an update to the base-station energy-saving information at the target level, the bit field identifier corresponding to the energy-saving information of the energy-saving solution of the target energy-saving domain contained in the base-station energy-saving information at the target level is used to indicate the updated energy-saving information, and the target level is one of the cell level, level of a group of terminals, and terminal level.

The following is specifically described by Example 9:

Example 9

Step 91: the base station configures first DCI scrambled by at least one base-station energy-saving RNTI, where the first DCI is used to indicate base-station energy-saving information.

In this embodiment, the bit identifier (third bit field identifier) can be used to determine whether the energy-saving information of the time domain, the frequency domain, the spatial domain, the power domain, and another energy-saving solutions is updated, and the bit identifier (fourth bit field identifier) can be used to determine whether the base-station energy-saving information of the terminal group is updated.

If the energy-saving information of the energy-saving solution of the target energy-saving domain using the bit identifier (the third bit identifier) is updated, and the base-station energy-saving information of a terminal group using the bit identifier (the fourth bit identifier) is updated, it means that the energy-saving information of the energy-saving solution of the target energy-saving domain under the corresponding terminal group where the updating exists is updated, and the updated content is indicated by the corresponding bit field identifier under the updated target energy-saving domain.

Figure 13:
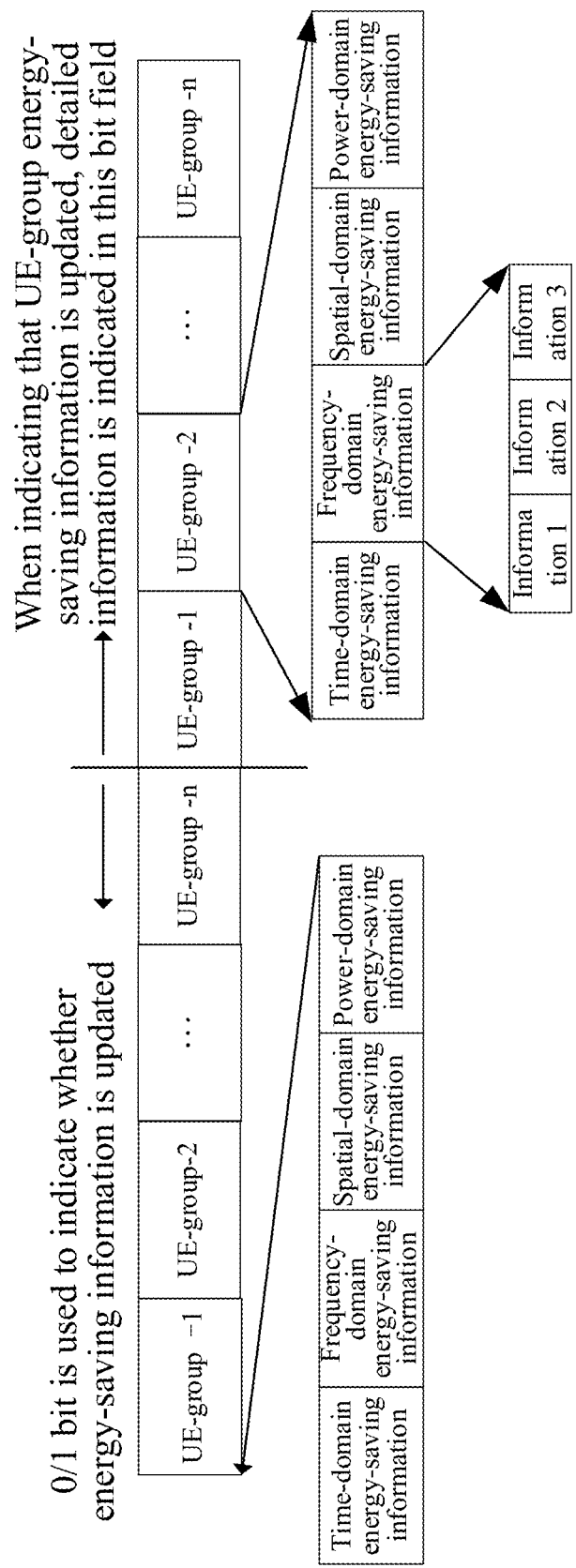
FIG. 13 is a third schematic diagram of indication information updating in first DCI scrambled by an energy-saving RNTI of a base station according to an embodiment of the present disclosure.

Referring to FIG. 13, the left side of the vertical line in the figure indicates the indication format of the DCI before updating, and the right side of the vertical line indicates the indication format of the DCI after updating.

Specifically, the bit 0 or 1 may be used to indicate whether the energy-saving information in the energy-saving domain is updated; and whether the base-station energy-saving information of the UE-group is updated. In this embodiment, it is indicated that the energy-saving information in the frequency domain is updated, and it is indicated that the energy-saving information in the base station of UE-group-2 is updated; it means that the energy-saving information in the frequency domain under UE-group-2 is updated, so the detailed information is indicated through the bit field corresponding to the energy-saving information of a frequency domain under UE-group-2, that is, the updated content of the energy-saving information of a frequency domain is indicated through the bit identifier.

Step 92: the base station sends a first DCI.

Specifically, the base station sends the first DCI on the corresponding first DCI transmission resources.

Here, the first DCI is carried on the PDCCH channel.

The disclosed embodiment of the present disclosure sends dynamic signaling to the terminal, and the dynamic signaling is used to indicate at least one of the base-station energy-saving information at the cell level, the base-station energy-saving information at the level of a group of terminals, and the base-station energy-saving information at the terminal level; wherein the base-station energy-saving information includes at least one of the following: energy-saving information of a time domain, the energy-saving information of a time domain includes energy-saving information of at least one time-domain energy-saving solution; energy-saving information of a frequency domain, the energy-saving information of a frequency domain includes energy-saving information of at least one frequency-domain energy-saving solution; energy-saving information of a spatial domain, the energy-saving information of a spatial domain includes energy-saving information of at least one spatial domain energy-saving solution; energy-saving information of a power domain, the energy-saving information of a power domain includes energy-saving information of at least one power-domain energy-saving solution; other energy-saving information other than the time domain, the frequency domain, the spatial domain and the power domain, the other energy-saving information includes energy-saving information of at least one another energy-saving solution, so that by the dynamic signaling and all information indicating the base station energy-saving that are jointly indicated, the indication flexibility of the base-station energy-saving information is increased, and the energy consumption of the base station can be further reduced by the method of joint indication by dynamic signaling, the signaling overhead of the base station is saved.

Figure 14:
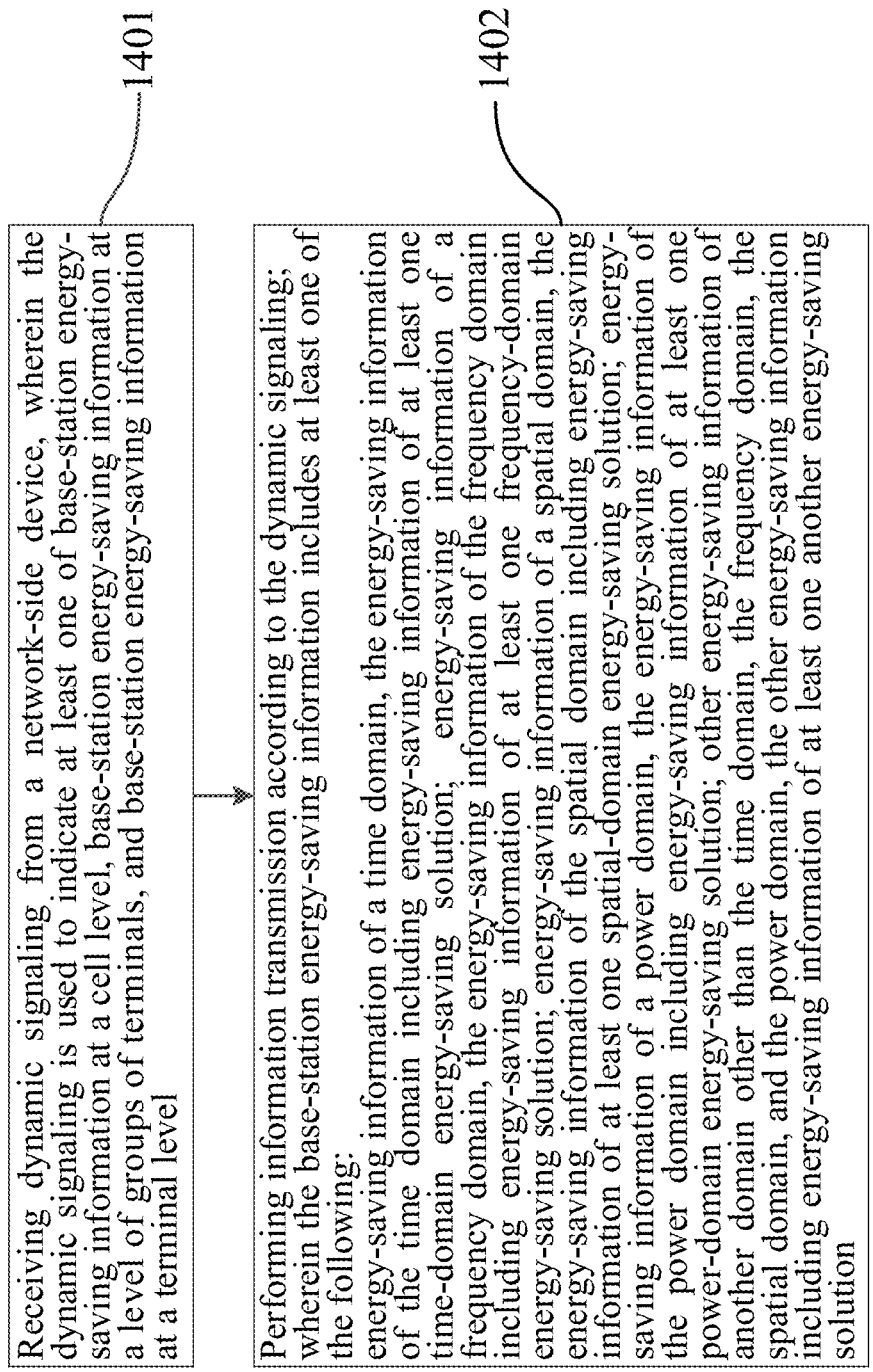
FIG. 14 is a second schematic flowchart of an information transmission method according to an embodiment of the present disclosure.

As shown in FIG. 14, a flow chart of an information transmission method is provided in an embodiment of the present disclosure. The method is applied to a terminal. The method includes:

Step 1401: receiving dynamic signaling from a network-side device, wherein the dynamic signaling is used to indicate at least one of base-station energy-saving information at a cell level, base-station energy-saving information at a level of a group of terminals, and base-station energy-saving information at a terminal level.

Optionally, the dynamic signaling is downlink control information DCI or media access control control element MAC CE.

Specifically, when the dynamic signaling is DCI, the DCI is DCI scrambled by at least one base-station energy-saving radio network temporary identity (Radio Network Temporary Identity, RNTI).

Step 1402: performing information transmission according to the dynamic signaling.

The base-station energy-saving information includes at least one of the following:
  energy-saving information of a time domain, the energy-saving information of the time domain including energy-saving information of at least one time-domain energy-saving solution;
  energy-saving information of a frequency domain, the energy-saving information of the frequency domain including energy-saving information of at least one frequency-domain energy-saving solution;
  energy-saving information of a spatial domain, the energy-saving information of the spatial domain including energy-saving information of at least one spatial-domain energy-saving solution;
  energy-saving information of a power domain, the energy-saving information of the power domain including energy-saving information of at least one power-domain energy-saving solution;
  other energy-saving information of another domain other than the time domain, the frequency domain, the spatial domain, and the power domain, the other energy-saving information including energy-saving information of at least one another energy-saving solution.

In an optional implementation, step 1402 may include:
according to the dynamic signaling, obtaining target base-station energy-saving information corresponding to the terminal;
performing the information transmission according to the target base-station energy-saving information.

Here, information transmission may include transmission of a common signal or channel, transmission of a periodic signal, transmission of a non-periodic signal, or transmission of a data channel, etc.

The transmission of common signals or channels includes: transmission of SSB, transmission of SI, transmission of CSI-RS, and transmission of TRS; the transmission of periodic signals or non-periodic signals includes: transmission of SSB signals, transmission of SI signals, transmission of CSI-RS signals, transmission of TRS signals, transmission of positioning reference signals, transmission of paging signals, transmission of phase tracking reference signals, and transmission of SRS reference signals; data channels include: a PDSCH channel, a PDCCH channel, a PUSCH channel, a PUCCH channel, and a PRACH channel.

Optionally, the time-domain energy-saving solution includes at least one of the following:
a transmission indication of a first object, where the first object includes a common signal and/or a common channel;
a transmission indication of a second object, wherein the second object includes at least one of a semi-persistent signal, a semi-persistent channel, a periodic signal, and a periodic channel;
dynamic cell shutdown indication;
indications related to reference signals;
indication of the terminal's discontinuous reception configuration;
indication of discontinuous transmission configuration or discontinuous reception configuration of the base station;
indication of the energy-saving status of the base station.

Optionally, the frequency-domain energy-saving solution includes at least one of the following:
dynamic bandwidth adjustment indication for terminal groups;
on/off indication of dynamic cells under multi-carrier;
state indication of secondary cell;
switching indication of a dynamic primary cell of a terminal group;
parameter set switching indication for different frequency domain states of the base station.

Optionally, the spatial-domain energy-saving solution includes at least one of the following:
a switching indication of parameter sets of base-station spatial-domain unit parameters;
instructions for adjusting base-station spatial-domain unit parameters;
a configuration indication of a reference signal;
a joint indication of a first spatial-domain unit parameter and a reference signal configuration, wherein the first spatial-domain unit parameter includes a quantity of spatial-domain units or a spatial-domain unit index;
channel state information reference signal CSI-RS measurement or reporting configuration;
dynamic adjustment power indication.

Optionally, the power-domain energy-saving solution includes at least one of the following:
a transmit power of a first information;
an offset value of the transmit power of the first information relative to a reference power;
an indication of whether the transmit power of the first information is zero;
the first information includes at least one of a target signal, a target channel, a target time resource, a target frequency-domain resource, and a target spatial-domain resource;
the reference power is a transmit power of at least one of a reference signal, a reference channel, a reference time-domain resource, a reference frequency-domain resource, and a reference spatial-domain resource.

The target signal includes at least one of a synchronization signal, a channel state indication signal, a time-frequency tracking signal, a phase tracking signal, and a positioning signal.

The target channel includes at least one of a control channel, a traffic channel, a physical channel, and a logical channel.

The target time resource includes an indicated time resource, wherein the indicated time resource includes at least one of a predefined time resource, a time resource configured by a radio resource control (RRC), and a time resource dynamically indicated;

The target frequency-domain resource includes an indicated frequency-domain resource, and the indicated frequency-domain resource includes at least one of a predefined frequency-domain resource, a frequency-domain resource configured by a radio resource control (RRC), and a frequency-domain resource dynamically indicated.

The target spatial-domain resource includes an indicated spatial-domain resource, and the indicated spatial-domain resource includes at least one of a predefined spatial-domain resource, a spatial-domain resource configured by a radio resource control (RRC), and a spatial-domain resource dynamically indicated.

The reference signal includes at least one of a synchronization signal, a channel state indication signal, a time-frequency tracking signal, a phase tracking signal, and a positioning signal.

The reference channel includes at least one of a control channel, a traffic channel, a physical channel, and a logical channel.

The reference time-domain resource includes an indicated time resource, wherein the indicated time resource includes at least one of a predefined time resource, a time resource configured by a radio resource control (RRC), and a time resource dynamically indicated.

The reference frequency-domain resource includes an indicated frequency-domain resource, and the indicated frequency-domain resource includes at least one of a predefined frequency-domain resource, a frequency-domain resource configured by a radio resource control (RRC), and a frequency-domain resource dynamically indicated.

The reference spatial-domain resources include indicated spatial-domain resources, and the indicated spatial-domain resources include at least one of a predefined spatial-domain resource, a spatial-domain resource configured by a radio resource control (RRC), and a spatial-domain resource dynamically indicated.

Optionally, other energy-saving solutions include at least one of the following: a power amplifier coefficient adjustment solution; a peak to average power ratio reduction solution.

The information transmission method of the embodiment of the present disclosure receives dynamic signaling sent by a network side device, where the dynamic signaling is used to indicate at least one of base-station energy-saving information at a cell level, base-station energy-saving information at a level of a group of terminals, and base-station energy-saving information at a terminal level; information is transmitted according to the indication of the dynamic signaling; wherein the base-station energy-saving information includes at least one of the following: energy-saving information of a time domain, which includes energy-saving information of at least one time-domain energy-saving solution; energy-saving information of a frequency domain, which includes energy-saving information of at least one frequency-domain energy-saving solution; energy-saving information of a spatial domain, which includes energy-saving information of at least one spatial domain energy-saving solution; energy-saving information of a power domain, which includes energy-saving information of at least one power-domain energy-saving solution; other energy-saving information other than the time domain, the frequency domain, the spatial domain and the power domain, which includes energy-saving information of at least one another energy-saving solution, so that information transmission is achieved by receiving all the information of base station energy-saving jointly indicated by dynamic signaling and based on the flexible indication of base-station energy-saving information.

In an optional implementation, the dynamic signaling is used to indicate base-station energy-saving information of at least one terminal group; the base-station energy-saving information of each of the at least one terminal group includes at least one of the energy-saving information of the time domain, the energy-saving information of the frequency domain, the energy-saving information of the spatial domain, the energy-saving information of the power domain, and the another energy-saving information.

In another optional implementation, the dynamic signaling is used to indicate at least one of the energy-saving information of the time domain, the energy-saving information of the frequency domain, the energy-saving information of the spatial domain, the energy-saving information of the power domain, and the another energy-saving information; wherein, the energy-saving information of each energy-saving domain includes energy-saving information for at least one terminal group of the energy-saving domain, and the energy-saving information of each of the at least one terminal group includes energy-saving information of the at least one energy-saving solution of the energy-saving domain, and the energy-saving domain includes one of the time domain, the frequency domain, the spatial domain, the power domain, and the another domain other than the time domain, the frequency domain, the spatial domain and the power domain.

In another optional implementation, the dynamic signaling is used to indicate at least one of the following:
energy-saving information of at least one time-domain energy-saving solution; energy-saving information of at least one frequency-domain energy-saving solution; energy-saving information of at least one spatial-domain energy-saving solution; energy-saving information of at least one power-domain energy-saving solution; energy-saving information of at least one another energy-saving solution;
wherein, the energy-saving information of each energy-saving solution includes energy-saving information of at least one terminal group, and the energy-saving domain corresponding to the energy-saving information of the at least one terminal group is the same as the energy-saving domain corresponding to the energy-saving information of the energy-saving solution, and the energy-saving domain includes one of the time domain, the frequency domain, the spatial domain, the power domain, and the another domain other than the time domain, the frequency domain, the spatial domain, the power domain.

In another optional implementation, the dynamic signaling is used to indicate at least one of the following:
energy-saving information of at least one time-domain energy-saving solution; energy-saving information of at least one frequency-domain energy-saving solution; energy-saving information for at least one spatial-domain energy-saving solution; energy-saving information of at least one power-domain energy-saving solution; energy-saving information of at least one another energy-saving solution;
wherein the energy-saving information of each energy-saving solution includes at least one of the energy-saving information at the cell level, the energy-saving information at the level of a group of terminals, and the energy-saving information at the terminal level of the energy-saving domain corresponding to the energy-saving information of the energy-saving solution, and the energy-saving domain includes one of the time domain, the frequency domain, the spatial domain, the power domain, and the another domain other than the time domain, the frequency domain, the spatial domain, and the power domain.

In another optional implementation, the dynamic signaling includes a first bit field identifier, and energy-saving information of energy-saving solutions of different energy-saving domains is indicated by the first bit field identifier; or, the dynamic signaling includes a second bit field identifier and a radio resource control RRC identifier, and energy-saving information of energy-saving solutions of different energy-saving domains is jointly indicated by the second bit field identifier and the RRC identifier; or, the dynamic signaling includes bit information representing a time-frequency-space domain unit, and energy-saving information of energy-saving solutions in different energy-saving domains is indicated by the bit information, and the energy-saving domain includes one of a time domain, a frequency domain, a spatial domain, a power domain, and another domain other than the time domain, the frequency domain, the spatial domain, and the power domain.

In an optional implementation, the dynamic signaling includes a third bit field identifier, and the third bit field identifier is used to indicate whether the energy-saving information of energy-saving solutions of different energy-saving domains is updated; when the third bit field identifier indicates that the energy-saving information of an energy-saving solution of a target energy-saving domain in the different energy-saving domains is updated, the bit field identifier corresponding to the energy-saving information of the energy-saving solution of the target energy-saving domain is used to indicate the updated energy-saving information, and the energy-saving domain includes one of the time domain, the frequency domain, the spatial domain, the power domain, and another domain other than the time domain, the frequency domain, the spatial domain, and the power domain.

Furthermore, the dynamic signaling further includes a fourth bit field identifier, the fourth bit field identifier is used to indicate whether at least one of the base-station energy-saving information at the cell level, the base-station energy-saving information at the level of a group of terminals, and the base-station energy-saving information at the terminal level is updated;

when the fourth bit field identifier indicates that the base-station energy-saving information at a target level is updated, and the third bit field identifier corresponding to the base-station energy-saving information at the target level indicates that the energy-saving information of the energy-saving solution of the target energy-saving domain is updated, the bit field identifier corresponding to the energy-saving information of the energy-saving solution of the target energy-saving domain contained in the base-station energy-saving information at the target level is used to indicate the updated energy-saving information; or when the third bit field identifier indicates that the energy-saving information of the energy-saving solution of the target energy-saving domain is updated, and the fourth bit field identifier indicates that the base-station energy-saving information at the target level is updated, the bit field identifier corresponding to the energy-saving information of the energy-saving solution of the target energy-saving domain contained in the base-station energy-saving information at the target level is used to indicate the updated energy-saving information, and the target level is one of the cell level, the level of a group of terminals, and the terminal level.

The information transmission method in the present disclosure, by receiving all the information about the base-station energy-saving jointly indicated with the dynamic signaling, realizes the transmission of information based on the flexible indication of the base-station energy-saving information.

Figure 15:
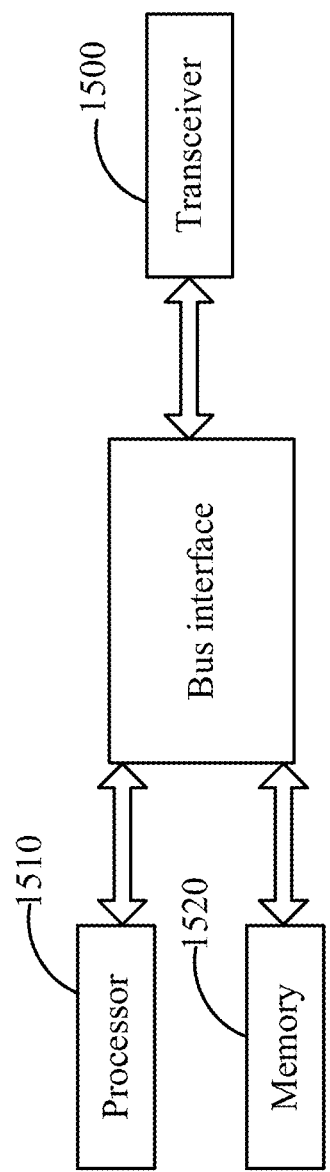
FIG. 15 is a structural block diagram of a network side device according to an embodiment of the present disclosure.

As shown in FIG. 15, an embodiment of the present disclosure further provides a network side device, including: a memory 1520, a transceiver 1500, and a processor 1510, wherein the memory 1520 is used to store a computer program; the transceiver 1500 is used to send and receive data under the control of the processor 1510; the processor 1510 is used to read the computer program in the memory 1520 and perform the following operations:

sending dynamic signaling to a terminal through the transceiver 1500, wherein the dynamic signaling is used to indicate at least one of base-station energy-saving information at a cell level, base-station energy-saving information at a level of a group of terminals, and base-station energy-saving information at a terminal level;

wherein the base-station energy-saving information includes at least one of the following:

energy-saving information of a time domain, the energy-saving information of the time domain including energy-saving information of at least one time-domain energy-saving solution;

energy-saving information of a frequency domain, the energy-saving information of the frequency domain including energy-saving information of at least one frequency-domain energy-saving solution;

energy-saving information of a spatial domain, the energy-saving information of the spatial domain including energy-saving information of at least one spatial-domain energy-saving solution;

energy-saving information of a power domain, the energy-saving information of the power domain including energy-saving information of at least one power-domain energy-saving solution;

other energy-saving information of another domain other than the time domain, the frequency domain, the spatial domain, and the power domain, the other energy-saving information including energy-saving information of at least one another energy-saving solution.

In FIG. 15, the bus architecture may include any number of interconnected buses and bridges, specifically one or more processors represented by processor 1510 and various circuits of memory represented by memory 1520 are linked together. The bus architecture may also link together various other circuits such as peripherals, voltage regulators, and power management circuits, which are well known in the art and are therefore not further described herein. The bus interface provides an interface. The transceiver 1500 may be a plurality of components, namely, a transmitter and a receiver, providing a unit for communicating with various other devices on a transmission medium, which may include a wireless channel, a wired channel, an optical cable, and other transmission media. The processor 1510 is responsible for managing the bus architecture and general processing, and the memory 1520 may store data used by the processor 1510 when performing operations.

The processor 1510 may be a central processing unit (CPU), an application specific integrated circuit (ASIC), a field programmable gate array (FPGA) or a complex programmable logic device (CPLD). The processor may also adopt a multi-core architecture.

Optionally, the dynamic signaling is downlink control information DCI or media access control unit MAC-CE.

Optionally, when the dynamic signaling is DCI, the DCI is DCI scrambled by at least one base-station energy-saving radio network temporary identifier RNTI.

Optionally, the dynamic signaling is used to indicate base-station energy-saving information of at least one terminal group; the base-station energy-saving information of each terminal group includes at least one of energy-saving information of a time domain, energy-saving information of a frequency domain, energy-saving information of a spatial domain, energy-saving information of a power domain, and other energy-saving information.

Optionally, the dynamic signaling is used to indicate at least one of energy-saving information of a time domain, energy-saving information of a frequency domain, energy-saving information of a spatial domain, energy-saving information of a power domain, and other energy-saving information; the energy-saving information of each energy-saving domain includes energy-saving information for at least one terminal group of the energy-saving domain, and the energy-saving information of each terminal group includes energy-saving information of at least one energy-saving solution of the energy-saving domain, and the energy-saving domain includes one of the time domain, the frequency domain, the spatial domain, the power domain, and the another domain other than the time domain, the frequency domain, the spatial domain, and the power domain.

Optionally, the dynamic signaling is used to indicate at least one of the following: energy-saving information of at least one time-domain energy-saving solution; energy-saving information of at least one frequency-domain energy-saving solution; energy-saving information of at least one spatial-domain energy-saving solution; energy-saving information of at least one power-domain energy-saving solution; energy-saving information of at least one another energy-saving solution; wherein, the energy-saving information of each energy-saving solution includes energy-saving information of at least one terminal group, and the energy-saving domain corresponding to the energy-saving information of the at least one terminal group is the same as the energy-saving domain corresponding to the energy-saving information of the energy-saving solution, and the energy-saving domain includes one of the time domain, the frequency domain, the spatial domain, the power domain, and the another domain other than the time domain, the frequency domain, the spatial domain, the power domain.

Optionally, the dynamic signaling is used to indicate at least one of the following: energy-saving information of at least one time-domain energy-saving solution; energy-saving information of at least one frequency-domain energy-saving solution; energy-saving information for at least one spatial-domain energy-saving solution; energy-saving information of at least one power-domain energy-saving solution; energy-saving information of at least one another energy-saving solution; wherein the energy-saving information of each energy-saving solution includes at least one of the energy-saving information at the cell level, the energy-saving information at the level of a group of terminals, and the energy-saving information at the terminal level of the energy-saving domain corresponding to the energy-saving information of the energy-saving solution, and the energy-saving domain includes one of the time domain, the frequency domain, the spatial domain, the power domain, and the another domain other than the time domain, the frequency domain, the spatial domain, and the power domain.

Optionally, the dynamic signaling includes a first bit field identifier, and energy-saving information of energy-saving solutions of different energy-saving domains is indicated by the first bit field identifier; or, the dynamic signaling includes a second bit field identifier and a radio resource control RRC identifier, and energy-saving information of energy-saving solutions of different energy-saving domains is jointly indicated by the second bit field identifier and the RRC identifier; or, the dynamic signaling includes bit information representing a time-frequency-space domain unit, and energy-saving information of energy-saving solutions in different energy-saving domains is indicated by the bit information, and the energy-saving domain includes one of a time domain, a frequency domain, a spatial domain, a power domain, and another domain other than the time domain, the frequency domain, the spatial domain, and the power domain.

Optionally, the dynamic signaling includes a third bit field identifier, and the third bit field identifier is used to indicate whether the energy-saving information of energy-saving solutions of different energy-saving domains is updated; when the third bit field identifier indicates that the energy-saving information of an energy-saving solution of a target energy-saving domain in the different energy-saving domains is updated, the bit field identifier corresponding to the energy-saving information of the energy-saving solution of the target energy-saving domain is used to indicate the updated energy-saving information, and the energy-saving domain includes one of the time domain, the frequency domain, the spatial domain, the power domain, and another domain other than the time domain, the frequency domain, the spatial domain, and the power domain.

Optionally, the dynamic signaling further includes a fourth bit field identifier, the fourth bit field identifier is used to indicate whether at least one of the base-station energy-saving information at the cell level, the base-station energy-saving information at the level of a group of terminals, and the base-station energy-saving information at the terminal level is updated; when the fourth bit field identifier indicates that the base-station energy-saving information at a target level is updated, and the third bit field identifier corresponding to the base-station energy-saving information at the target level indicates that the energy-saving information of the energy-saving solution of the target energy-saving domain is updated, the bit field identifier corresponding to the energy-saving information of the energy-saving solution of the target energy-saving domain contained in the base-station energy-saving information at the target level is used to indicate the updated energy-saving information; or when the third bit field identifier indicates that the energy-saving information of the energy-saving solution of the target energy-saving domain is updated, and the fourth bit field identifier indicates that the base-station energy-saving information at the target level is updated, the bit field identifier corresponding to the energy-saving information of the energy-saving solution of the target energy-saving domain contained in the base-station energy-saving information at the target level is used to indicate the updated energy-saving information, and the target level is one of the cell level, the level of a group of terminals, and the terminal level.

Optionally, the processor 1510 is further configured to: configure at least one base-station energy-saving RNTI; scramble a first instruction according to the at least one base-station energy-saving RNTI, and obtain the dynamic signaling; wherein the at least one base-station energy-saving RNTI is used to indicate at least one of the following: grouping of energy-saving information types; grouping at the level of a group of terminals; grouping at the cell level and the level of a group of terminals; grouping at the cell level and the terminal level; grouping at the level of a group of terminals and the terminal level; grouping of information contents of energy-saving information types.

Optionally, the time-domain energy-saving solution includes at least one of the following: a transmission indication of a first object, wherein the first object includes a common signal and/or a common channel; a transmission indication of a second object, wherein the second object includes: at least one of a semi-persistent signal, a semi-persistent channel, a periodic signal, and a periodic channel; a dynamic cell shutdown indication; indications related to reference signals; an indication of a discontinuous reception configuration of a terminal; an indication of a discontinuous transmission configuration or a discontinuous reception configuration of a base station; indication of an energy-saving status of the base station.

Optionally, the frequency-domain energy-saving solution includes at least one of the following: dynamic bandwidth adjustment indication of terminal groups; shutdown indication of dynamic cells under multi-carrier; status indication of the secondary cell; a switching indication of dynamic primary cells of terminal groups; a parameter set switching indication for different frequency domain states of the base station.

Optionally, the spatial-domain energy-saving solution includes at least one of the following: a switching indication of parameter sets of base-station spatial-domain unit parameters; instructions for adjusting base-station spatial-domain unit parameters; a configuration indication of a reference signal; a joint indication of a first spatial-domain unit parameter and a reference signal configuration, wherein the first spatial-domain unit parameter includes a quantity of spatial-domain units or a spatial-domain unit index; channel state information reference signal CSI-RS measurement or reporting configuration; dynamic adjustment power indication.

Optionally, the power-domain energy-saving solution includes at least one of the following: a transmit power of a first information; an offset value of the transmit power of the first information relative to a reference power; an indication of whether the transmit power of the first information is zero; wherein the first information includes at least one of a target signal, a target channel, a target time resource, a target frequency-domain resource, and a target spatial-domain resource; the reference power is a transmit power of at least one of a reference signal, a reference channel, a reference time-domain resource, a reference frequency-domain resource, and a reference spatial-domain resource.

Optionally, another energy-saving solutions include at least one of the following: a solution of power amplifier coefficient adjustment; a solution of peak to average power ratio reduction.

The network side device of the present disclosure increases the indication flexibility of the base-station energy-saving information by jointly indicating all the information indicating the base-station energy-saving and the dynamic signaling, and can further reduce the energy consumption of the base station and save the signaling overhead of the base station through the method of joint indication of dynamic signaling.

Figure 16:
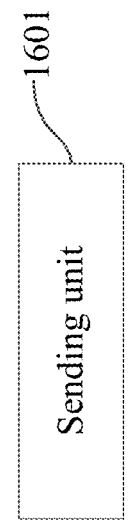
FIG. 16 is a first schematic diagram of modules of an information transmission device according to an embodiment of the present disclosure.

As shown in FIG. 16, The present disclosure also provides an information transmission device, including a sending unit 1601 configured to send dynamic signaling to a terminal, wherein the dynamic signaling is used to indicate at least one of base-station energy-saving information at a cell level, base-station energy-saving information at a level of a group of terminals, and base-station energy-saving information at a terminal level;

wherein the base-station energy-saving information includes at least one of the following: energy-saving information of a time domain, the energy-saving information of the time domain including energy-saving information of at least one time-domain energy-saving solution; energy-saving information of a frequency domain, the energy-saving information of the frequency domain including energy-saving information of at least one frequency-domain energy-saving solution; energy-saving information of a spatial domain, the energy-saving information of the spatial domain including energy-saving information of at least one spatial-domain energy-saving solution; energy-saving information of a power domain, the energy-saving information of the power domain including energy-saving information of at least one power-domain energy-saving solution; other energy-saving information of another domain other than the time domain, the frequency domain, the spatial domain, and the power domain, the other energy-saving information including energy-saving information of at least one another energy-saving solution.

Optionally, the dynamic signaling is downlink control information DCI or media access control unit MAC-CE.

Optionally, when the dynamic signaling is DCI, the DCI is DCI scrambled by at least one base-station energy-saving radio network temporary identifier RNTI.

Optionally, the dynamic signaling is used to indicate base-station energy-saving information of at least one terminal group; the base-station energy-saving information of each terminal group includes at least one of energy-saving information of a time domain, energy-saving information of a frequency domain, energy-saving information of a spatial domain, energy-saving information of a power domain, and other energy-saving information.

Optionally, the dynamic signaling is used to indicate at least one of energy-saving information of a time domain, energy-saving information of a frequency domain, energy-saving information of a spatial domain, energy-saving information of a power domain, and other energy-saving information; the energy-saving information of each energy-saving domain includes energy-saving information for at least one terminal group of the energy-saving domain, and the energy-saving information of each terminal group includes energy-saving information of at least one energy-saving solution of the energy-saving domain, and the energy-saving domain includes one of the time domain, the frequency domain, the spatial domain, the power domain, and the another domain other than the time domain, the frequency domain, the spatial domain, and the power domain.

Optionally, the dynamic signaling is used to indicate at least one of the following: energy-saving information of at least one time-domain energy-saving solution; energy-saving information of at least one frequency-domain energy-saving solution; energy-saving information of at least one spatial-domain energy-saving solution; energy-saving information of at least one power-domain energy-saving solution; energy-saving information of at least one another energy-saving solution; wherein, the energy-saving information of each energy-saving solution includes energy-saving information of at least one terminal group, and the energy-saving domain corresponding to the energy-saving information of the at least one terminal group is the same as the energy-saving domain corresponding to the energy-saving information of the energy-saving solution, and the energy-saving domain includes one of the time domain, the frequency domain, the spatial domain, the power domain, and the another domain other than the time domain, the frequency domain, the spatial domain, the power domain.

Optionally, the dynamic signaling is used to indicate at least one of the following: energy-saving information of at least one time-domain energy-saving solution; energy-saving information of at least one frequency-domain energy-saving solution; energy-saving information of at least one spatial-domain energy-saving solution; energy-saving information of at least one power-domain energy-saving solution; energy-saving information of at least one another energy-saving solution; wherein the energy-saving information of each energy-saving solution includes at least one of the energy-saving information at the cell level, the energy-saving information at the level of a group of terminals, and the energy-saving information at the terminal level of the energy-saving domain corresponding to the energy-saving information of the energy-saving solution, and the energy-saving domain includes one of the time domain, the frequency domain, the spatial domain, the power domain, and the another domain other than the time domain, the frequency domain, the spatial domain, and the power domain.

Optionally, the dynamic signaling includes a first bit field identifier, and energy-saving information of energy-saving solutions of different energy-saving domains is indicated by the first bit field identifier; or, the dynamic signaling includes a second bit field identifier and a radio resource control RRC identifier, and energy-saving information of energy-saving solutions of different energy-saving domains is jointly indicated by the second bit field identifier and the RRC identifier; or, the dynamic signaling includes bit information representing a time-frequency-space domain unit, and energy-saving information of energy-saving solutions in different energy-saving domains is indicated by the bit information, and the energy-saving domain includes one of a time domain, a frequency domain, a spatial domain, a power domain, and another domain other than the time domain, the frequency domain, the spatial domain, and the power domain.

Optionally, the dynamic signaling includes a third bit field identifier, and the third bit field identifier is used to indicate whether the energy-saving information of energy-saving solutions of different energy-saving domains is updated; when the third bit field identifier indicates that the energy-saving information of an energy-saving solution of a target energy-saving domain in the different energy-saving domains is updated, the bit field identifier corresponding to the energy-saving information of the energy-saving solution of the target energy-saving domain is used to indicate the updated energy-saving information, and the energy-saving domain includes one of the time domain, the frequency domain, the spatial domain, the power domain, and another domain other than the time domain, the frequency domain, the spatial domain, and the power domain.

Optionally, the dynamic signaling further includes a fourth bit field identifier, the fourth bit field identifier is used to indicate whether at least one of the base-station energy-saving information at the cell level, the base-station energy-saving information at the level of a group of terminals, and the base-station energy-saving information at the terminal level is updated; when the fourth bit field identifier indicates that the base-station energy-saving information at a target level is updated, and the third bit field identifier corresponding to the base-station energy-saving information at the target level indicates that the energy-saving information of the energy-saving solution of the target energy-saving domain is updated, the bit field identifier corresponding to the energy-saving information of the energy-saving solution of the target energy-saving domain contained in the base-station energy-saving information at the target level is used to indicate the updated energy-saving information; or when the third bit field identifier indicates that the energy-saving information of the energy-saving solution of the target energy-saving domain is updated, and the fourth bit field identifier indicates that the base-station energy-saving information at the target level is updated, the bit field identifier corresponding to the energy-saving information of the energy-saving solution of the target energy-saving domain contained in the base-station energy-saving information at the target level is used to indicate the updated energy-saving information, and the target level is one of the cell level, the level of a group of terminals, and the terminal level.

Optionally, the information transmission device further includes: a configuration unit, configured to configure at least one base-station energy-saving RNTI; a scrambling unit, configured to scramble a first instruction according to the at least one base-station energy-saving RNTI, and obtain the dynamic signaling; wherein the at least one base-station energy-saving RNTI is used to indicate at least one of the following: grouping of energy-saving information types; grouping at the level of a group of terminals; grouping at the cell level and the level of a group of terminals; grouping at the cell level and the terminal level; grouping at the level of a group of terminals and the terminal level; grouping of information contents of energy-saving information types.

Optionally, the time-domain energy-saving solution includes at least one of the following: a transmission indication of a first object, wherein the first object includes a common signal and/or a common channel; a transmission indication of a second object, wherein the second object includes: at least one of a semi-persistent signal, a semi-persistent channel, a periodic signal, and a periodic channel; a dynamic cell shutdown indication; indications related to reference signals; an indication of a discontinuous reception configuration of a terminal; an indication of a discontinuous transmission configuration or a discontinuous reception configuration of a base station; indication of an energy-saving status of the base station.

Optionally, the frequency-domain energy-saving solution includes at least one of the following: dynamic bandwidth adjustment indication of terminal groups; shutdown indication of dynamic cells under multi-carrier; status indication of the secondary cell; a switching indication of dynamic primary cells of terminal groups; a parameter set switching indication for different frequency domain states of the base station.

Optionally, the spatial-domain energy-saving solution includes at least one of the following: a switching indication of parameter sets of base-station spatial-domain unit parameters; instructions for adjusting base-station spatial-domain unit parameters; a configuration indication of a reference signal; a joint indication of a first spatial-domain unit parameter and a reference signal configuration, wherein the first spatial-domain unit parameter includes a quantity of spatial-domain units or a spatial-domain unit index; channel state information reference signal CSI-RS measurement or reporting configuration; dynamic adjustment power indication.

Optionally, the power-domain energy-saving solution includes at least one of the following: a transmit power of a first information; an offset value of the transmit power of the first information relative to a reference power; an indication of whether the transmit power of the first information is zero; wherein the first information includes at least one of a target signal, a target channel, a target time resource, a target frequency-domain resource, and a target spatial-domain resource; the reference power is a transmit power of at least one of a reference signal, a reference channel, a reference time-domain resource, a reference frequency-domain resource, and a reference spatial-domain resource.

Optionally, another energy-saving solutions include at least one of the following: a solution of power amplifier coefficient adjustment; a solution of peak to average power ratio reduction.

The information transmission device of the present disclosure sends dynamic signaling to the terminal, and the dynamic signaling is used to indicate at least one of the base-station energy-saving information at the cell level, the base-station energy-saving information at the level of a group of terminals, and the base-station energy-saving information at the terminal level; wherein the base-station energy-saving information includes at least one of the following: energy-saving information of a time domain, the energy-saving information of a time domain includes energy-saving information of at least one time-domain energy-saving solution; energy-saving information of a frequency domain, the energy-saving information of a frequency domain includes energy-saving information of at least one frequency-domain energy-saving solution; energy-saving information of a spatial domain, the energy-saving information of a spatial domain includes energy-saving information of at least one spatial domain energy-saving solution; energy-saving information of a power domain, the energy-saving information of a power domain includes energy-saving information of at least one power-domain energy-saving solution; other energy-saving information other than time domain, frequency domain, spatial domain and power domain, the other energy-saving information includes energy-saving information of at least one another energy-saving solution. In this way, all the information indicating the base station energy-saving is jointly indicated by dynamic signaling, which increases the indication flexibility of the base-station energy-saving information, and the method of joint indication by dynamic signaling can further reduce the energy consumption of the base station and save the signaling overhead of the base station.

It should be noted that the division of units in the embodiments of the present application is schematic and is only a logical function division. There may be other division methods in actual implementation. In addition, each functional unit in each embodiment of the present application may be integrated into a processing unit, or each unit may exist physically separately, or two or more units may be integrated into one unit. The above-mentioned integrated unit may be implemented in the form of hardware or in the form of software functional units.

If the integrated unit is implemented in the form of a software functional unit and sold or used as an independent product, it can be stored in a processor-readable storage medium. Based on this understanding, the technical solution of the present application is essentially or the part that contributes to the relevant technology or all or part of the technical solution can be embodied in the form of a software product. The computer software product is stored in a storage medium, including several instructions to enable a computer device (which can be a personal computer, server, or network device, etc.) or a processor (processor) to execute all or part of the steps of the method described in each embodiment of the present application. The aforementioned storage medium includes: U disk, mobile hard disk, read-only memory (Read-Only Memory, ROM), random access memory (Random Access Memory, RAM), disk or optical disk and other media that can store program code.

It should be noted here that the above-mentioned device provided in the embodiment of the present disclosure can implement all the method steps implemented in the above-mentioned method embodiment, and can achieve the same technical effect. The parts and beneficial effects of this embodiment that are the same as those in the method embodiment will not be described in detail here.

In some embodiments of the present disclosure, a processor-readable storage medium is further provided, wherein the processor-readable storage medium stores program instructions, and the program instructions are used to enable the processor to execute the following steps: sending dynamic signaling to a terminal, wherein the dynamic signaling is used to indicate at least one of base-station energy-saving information at a cell level, base-station energy-saving information at a terminal-group level, and base-station energy-saving information at a terminal level;

Wherein the base-station energy-saving information includes at least one of the following: energy-saving information of a time domain, the energy-saving information of the time domain including energy-saving information of at least one time-domain energy-saving solution; energy-saving information of a frequency domain, the energy-saving information of the frequency domain including energy-saving information of at least one frequency-domain energy-saving solution; energy-saving information of a spatial domain, the energy-saving information of the spatial domain including energy-saving information of at least one spatial-domain energy-saving solution; energy-saving information of a power domain, the energy-saving information of the power domain including energy-saving information of at least one power-domain energy-saving solution; other energy-saving information of another domain other than the time domain, the frequency domain, the spatial domain, and the power domain, the other energy-saving information including energy-saving information of at least one another energy-saving solution.

All the implementation methods of the method embodiment applied to the network side device side as shown in FIG. 1 are implemented when the program is executed by a processor. To avoid repetition, they are not repeated here.

Figure 17:
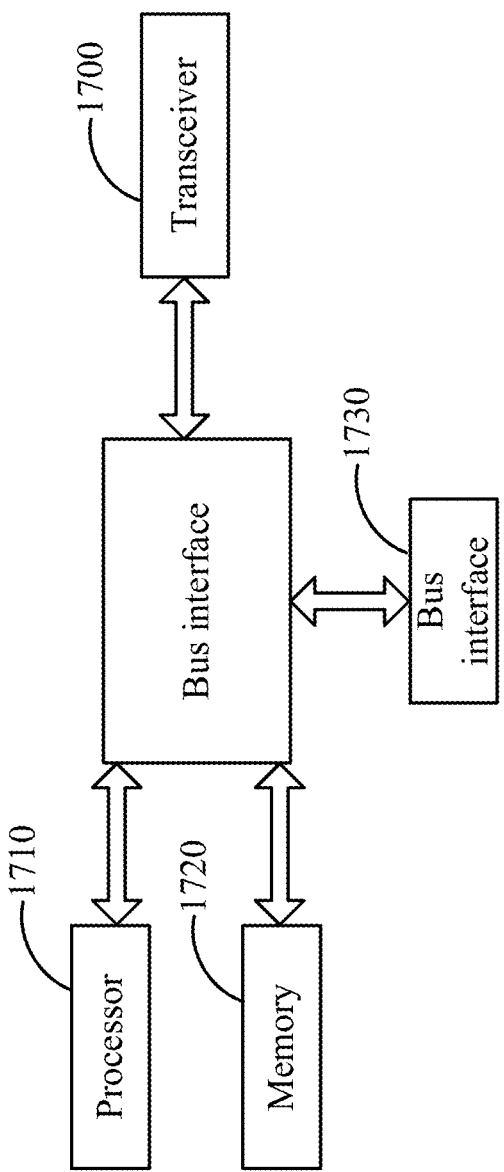
FIG. 17 is a structural block diagram of a terminal according to an embodiment of the present disclosure.

As shown in FIG. 17, an embodiment of the present disclosure further provides a terminal, including: a memory 1720, a transceiver 1700, and a processor 1710, wherein the memory 1720 is used to store program instructions; the transceiver 1700 is used to send and receive data under the control of the processor 1710; the processor 1710 is used to read the program instructions in the memory 1720, and the transceiver 1700 is used to perform the following operations:

receiving dynamic signaling from a network-side device, wherein the dynamic signaling is used to indicate at least one of base-station energy-saving information at a cell level, base-station energy-saving information at a level of a group of terminals, and base-station energy-saving information at a terminal level; performing information transmission according to the dynamic signaling; wherein the base-station energy-saving information includes at least one of the following: energy-saving information of a time domain, the energy-saving information of the time domain including energy-saving information of at least one time-domain energy-saving solution; energy-saving information of a frequency domain, the energy-saving information of the frequency domain including energy-saving information of at least one frequency-domain energy-saving solution; energy-saving information of a spatial domain, the energy-saving information of the spatial domain including energy-saving information of at least one spatial-domain energy-saving solution; energy-saving information of a power domain, the energy-saving information of the power domain including energy-saving information of at least one power-domain energy-saving solution; other energy-saving information of another domain other than the time domain, the frequency domain, the spatial domain, and the power domain, the other energy-saving information including energy-saving information of at least one another energy-saving solution.

In FIG. 17, the bus architecture may include any number of interconnected buses and bridges, specifically one or more processors represented by processor 1710 and various circuits of memory represented by memory 1720 are linked together. The bus architecture can also link various other circuits such as peripherals, voltage regulators, and power management circuits together, which are all well known in the art, and therefore, are not further described herein. The bus interface provides an interface. The transceiver 1700 can be a plurality of components, namely, a transmitter and a receiver, providing a unit for communicating with various other devices on a transmission medium, and these transmission media include transmission media such as wireless channels, wired channels, and optical cables. For different user devices, the user interface 1730 can also be an interface that can be connected to external and internal devices, and the connected devices include but are not limited to keypads, displays, speakers, microphones, joysticks, etc.

The processor 1710 is responsible for managing the bus architecture and general processing, and the memory 1720 can store data used by the processor 1710 when performing operations.

Optionally, the processor 1710 may be a central processing unit (CPU), an application specific integrated circuit (ASIC), a field programmable gate array (FPGA) or a complex programmable logic device (CPLD), and the processor 1710 may also adopt a multi-core architecture.

Any method provided in the embodiment of the present application may be executed by the processor 1710 through invoking the program in the memory according to the obtained executable instructions. The processor 1710 and the memory 1720 can also be arranged physically separately.

Optionally, the processor 1710 is further configured to perform following: according to the dynamic signaling, obtaining target base-station energy-saving information corresponding to the terminal; performing the information transmission according to the target base-station energy-saving information.

Optionally, the dynamic signaling is downlink control information DCI or media access control unit MAC-CE.

Optionally, when the dynamic signaling is DCI, the DCI is DCI scrambled by a base station energy-saving radio network temporary identifier RNTI.

Optionally, the dynamic signaling is used to indicate the base-station energy-saving information of at least one terminal group; the base-station energy-saving information of each of the at least one terminal group includes at least one of the energy-saving information of the time domain, the energy-saving information of the frequency domain, the energy-saving information of the spatial domain, the energy-saving information of the power domain, and the another energy-saving information.

Optionally, the dynamic signaling is used to indicate at least one of the energy-saving information of the time domain, the energy-saving information of the frequency domain, the energy-saving information of the spatial domain, the energy-saving information of the power domain, and the another energy-saving information; wherein, the energy-saving information of each energy-saving domain includes energy-saving information for at least one terminal group of the energy-saving domain, and the energy-saving information of each of the at least one terminal group includes energy-saving information of the at least one energy-saving solution of the energy-saving domain, and the energy-saving domain includes one of the time domain, the frequency domain, the spatial domain, the power domain, and the another domain other than the time domain, the frequency domain, the spatial domain and the power domain.

Optionally, the dynamic signaling is used to indicate at least one of the following: energy-saving information of at least one time-domain energy-saving solution; energy-saving information of at least one frequency-domain energy-saving solution; energy-saving information of at least one spatial-domain energy-saving solution; energy-saving information of at least one power-domain energy-saving solution; energy-saving information of at least one another energy-saving solution; wherein the energy-saving information of each energy-saving solution includes energy-saving information of at least one terminal group, and the energy-saving domain corresponding to the energy-saving information of the at least one terminal group is the same as the energy-saving domain corresponding to the energy-saving information of the energy-saving solution, and the energy-saving domain includes one of the time domain, the frequency domain, the spatial domain, the power domain, and the another domain other than the time domain, the frequency domain, the spatial domain, the power domain.

Optionally, the dynamic signaling is used to indicate at least one of the following: energy-saving information of at least one time-domain energy-saving solution; energy-saving information of at least one frequency-domain energy-saving solution; energy-saving information for at least one spatial-domain energy-saving solution; energy-saving information of at least one power-domain energy-saving solution; energy-saving information of at least one another energy-saving solution; wherein the energy-saving information of each energy-saving solution includes at least one of the energy-saving information at the cell level, the energy-saving information at the level of groups of terminals, and the energy-saving information at the terminal level of the energy-saving domain corresponding to the energy-saving information of the energy-saving solution, and the energy-saving domain includes one of the time domain, the frequency domain, the spatial domain, the power domain, and the another domain other than the time domain, the frequency domain, the spatial domain, and the power domain.

Optionally, the dynamic signaling includes a first bit field identifier, and energy-saving information of energy-saving solutions of different energy-saving domains is indicated by the first bit field identifier; or, the dynamic signaling includes a second bit field identifier and a radio resource control RRC identifier, and energy-saving information of energy-saving solutions of different energy-saving domains is jointly indicated by the second bit field identifier and the RRC identifier; or, the dynamic signaling includes bit information representing a time-frequency-space domain unit, and energy-saving information of energy-saving solutions in different energy-saving domains is indicated by the bit information, and the energy-saving domain includes one of a time domain, a frequency domain, a spatial domain, a power domain, and another domain other than the time domain, the frequency domain, the spatial domain, and the power domain.

Optionally, the dynamic signaling includes a third bit field identifier, and the third bit field identifier is used to indicate whether the energy-saving information of energy-saving solutions of different energy-saving domains is updated; when the third bit field identifier indicates that the energy-saving information of an energy-saving solution of a target energy-saving domain in the different energy-saving domains is updated, the bit field identifier corresponding to the energy-saving information of the energy-saving solution of the target energy-saving domain is used to indicate the updated energy-saving information, and the energy-saving domain includes one of the time domain, the frequency domain, the spatial domain, the power domain, and another domain other than the time domain, the frequency domain, the spatial domain, and the power domain.

Optionally, the dynamic signaling further includes a fourth bit field identifier, the fourth bit field identifier is used to indicate whether at least one of the base-station energy-saving information at the cell level, the base-station energy-saving information at the level of groups of terminal, and the base-station energy-saving information at the terminal level is updated; when the fourth bit field identifier indicates that the base-station energy-saving information at a target level is updated, and the third bit field identifier corresponding to the base-station energy-saving information at the target level indicates that the energy-saving information of the energy-saving solution of the target energy-saving domain is updated, the bit field identifier corresponding to the energy-saving information of the energy-saving solution of the target energy-saving domain contained in the base-station energy-saving information at the target level is used to indicate the updated energy-saving information; or when the third bit field identifier indicates that the energy-saving information of the energy-saving solution of the target energy-saving domain is updated, and the fourth bit field identifier indicates that the base-station energy-saving information at the target level is updated, the bit field identifier corresponding to the energy-saving information of the energy-saving solution of the target energy-saving domain contained in the base-station energy-saving information at the target level is used to indicate the updated energy-saving information, and the target level is one of the cell level, the level of groups of terminals, and the terminal level.

Optionally, the time-domain energy-saving solution includes at least one of the following: a transmission indication of a first object, wherein the first object includes a common signal and/or a common channel; a transmission indication of a second object, wherein the second object includes: at least one of a semi-persistent signal, a semi-persistent channel, a periodic signal, and a periodic channel; a dynamic cell shutdown indication; indications related to reference signals; an indication of a discontinuous reception configuration of a terminal; an indication of a discontinuous transmission configuration or a discontinuous reception configuration of a base station; indication of an energy-saving status of the base station.

Optionally, the frequency-domain energy-saving solution includes at least one of the following: dynamic bandwidth adjustment indication of terminal groups; shutdown indication of dynamic cells under multi-carrier; status indication of the secondary cell; a switching indication of dynamic primary cells of terminal groups; a parameter set switching indication for different frequency domain states of the base station.

Optionally, the spatial-domain energy-saving solution includes at least one of the following: a switching indication of parameter sets of base-station spatial-domain unit parameters; instructions for adjusting base-station spatial-domain unit parameters; a configuration indication of a reference signal; a joint indication of a first spatial-domain unit parameter and a reference signal configuration, wherein the first spatial-domain unit parameter includes a quantity of spatial-domain units or a spatial-domain unit index; channel state information reference signal CSI-RS measurement or reporting configuration; dynamic adjustment power indication.

Optionally, the power-domain energy-saving solution includes at least one of the following: a transmit power of a first information; an offset value of the transmit power of the first information relative to a reference power; an indication of whether the transmit power of the first information is zero; the first information includes at least one of a target signal, a target channel, a target time resource, a target frequency-domain resource, and a target spatial-domain resource; the reference power is a transmit power of at least one of a reference signal, a reference channel, a reference time-domain resource, a reference frequency-domain resource, and a reference spatial-domain resource.

Optionally, the another energy-saving solution includes at least one of the following: a solution of power amplifier coefficient adjustment; a solution of peak to average power ratio reduction.

The terminal of the present disclosure receives all the information about energy-saving of the base station jointly indicated by the dynamic signaling, and realizes the transmission of information based on the flexible indication of the base-station energy-saving information.

Figure 18:
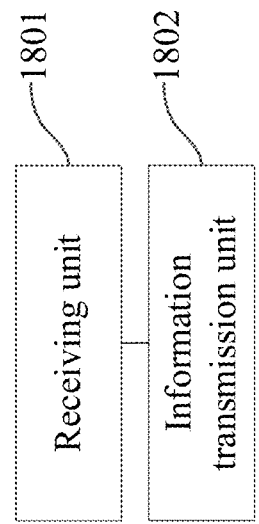
FIG. 18 is a second schematic diagram of modules of an information transmission device according to an embodiment of the present disclosure.

As shown in FIG. 18, the embodiment of the present disclosure further provides an information transmission device, including a receiving unit 1801, configured to receive dynamic signaling from a network-side device, wherein the dynamic signaling is used to indicate at least one of base-station energy-saving information at a cell level, base-station energy-saving information at a level of groups of terminals, and base-station energy-saving information at a terminal level; an information transmission unit 1802, configured to perform information transmission according to the dynamic signaling; wherein the base-station energy-saving information includes at least one of the following: energy-saving information of a time domain, the energy-saving information of the time domain including energy-saving information of at least one time-domain energy-saving solution; energy-saving information of a frequency domain, the energy-saving information of the frequency domain including energy-saving information of at least one frequency-domain energy-saving solution; energy-saving information of a spatial domain, the energy-saving information of the spatial domain including energy-saving information of at least one spatial-domain energy-saving solution; energy-saving information of a power domain, the energy-saving information of the power domain including energy-saving information of at least one power-domain energy-saving solution; other energy-saving information of another domain other than the time domain, the frequency domain, the spatial domain, and the power domain, the other energy-saving information including energy-saving information of at least one another energy-saving solution.

Optionally, the information transmission unit 1802 is specifically used for: according to the dynamic signaling, obtaining target base-station energy-saving information corresponding to the terminal; performing the information transmission according to the target base-station energy-saving information.

Optionally, the dynamic signaling is downlink control information DCI or media access control control element MAC-CE.

Optionally, when the dynamic signaling is DCI, the DCI is DCI scrambled by a base-station energy-saving radio network temporary identifier RNTI.

Optionally, the dynamic signaling is used to indicate the base-station energy-saving information of at least one terminal group; the base-station energy-saving information of each of the at least one terminal group includes at least one of the energy-saving information of the time domain, the energy-saving information of the frequency domain, the energy-saving information of the spatial domain, the energy-saving information of the power domain, and the another energy-saving information.

Optionally, the dynamic signaling is used to indicate at least one of the energy-saving information of the time domain, the energy-saving information of the frequency domain, the energy-saving information of the spatial domain, the energy-saving information of the power domain, and the another energy-saving information; wherein, the energy-saving information of each energy-saving domain includes energy-saving information for at least one terminal group of the energy-saving domain, and the energy-saving information of each of the at least one terminal group includes energy-saving information of the at least one energy-saving solution of the energy-saving domain, and the energy-saving domain includes one of the time domain, the frequency domain, the spatial domain, the power domain, and the another domain other than the time domain, the frequency domain, the spatial domain and the power domain.

Optionally, the dynamic signaling is used to indicate at least one of the following: energy-saving information of at least one time-domain energy-saving solution; energy-saving information of at least one frequency-domain energy-saving solution; energy-saving information of at least one spatial-domain energy-saving solution; energy-saving information of at least one power-domain energy-saving solution; energy-saving information of at least one another energy-saving solution; wherein, the energy-saving information of each energy-saving solution includes energy-saving information of at least one terminal group, and the energy-saving domain corresponding to the energy-saving information of the at least one terminal group is the same as the energy-saving domain corresponding to the energy-saving information of the energy-saving solution, and the energy-saving domain includes one of the time domain, the frequency domain, the spatial domain, the power domain, and the another domain other than the time domain, the frequency domain, the spatial domain, the power domain.

Optionally, the dynamic signaling is used to indicate at least one of the following: energy-saving information of at least one time-domain energy-saving solution; energy-saving information of at least one frequency-domain energy-saving solution; energy-saving information of at least one spatial-domain energy-saving solution; energy-saving information of at least one power-domain energy-saving solution; energy-saving information of at least one another energy-saving solution; wherein the energy-saving information of each energy-saving solution includes at least one of the energy-saving information at the cell level, the energy-saving information at the level of groups of terminals, and the energy-saving information at the terminal level of the energy-saving domain corresponding to the energy-saving information of the energy-saving solution, and the energy-saving domain includes one of the time domain, the frequency domain, the spatial domain, the power domain, and the another domain other than the time domain, the frequency domain, the spatial domain, and the power domain.

Optionally, the dynamic signaling includes a first bit field identifier, and energy-saving information of energy-saving solutions of different energy-saving domains is indicated by the first bit field identifier; or, the dynamic signaling includes a second bit field identifier and a radio resource control RRC identifier, and energy-saving information of energy-saving solutions of different energy-saving domains is jointly indicated by the second bit field identifier and the RRC identifier; or, the dynamic signaling includes bit information representing a time-frequency-space domain unit, and energy-saving information of energy-saving solutions in different energy-saving domains is indicated by the bit information, and the energy-saving domain includes one of a time domain, a frequency domain, a spatial domain, a power domain, and another domain other than the time domain, the frequency domain, the spatial domain, and the power domain.

Optionally, the dynamic signaling includes a third bit field identifier, and the third bit field identifier is used to indicate whether the energy-saving information of energy-saving solutions of different energy-saving domains is updated; when the third bit field identifier indicates that the energy-saving information of an energy-saving solution of a target energy-saving domain in the different energy-saving domains is updated, the bit field identifier corresponding to the energy-saving information of the energy-saving solution of the target energy-saving domain is used to indicate the updated energy-saving information, and the energy-saving domain includes one of the time domain, the frequency domain, the spatial domain, the power domain, and another domain other than the time domain, the frequency domain, the spatial domain, and the power domain.

Optionally, the dynamic signaling further includes a fourth bit field identifier, the fourth bit field identifier is used to indicate whether at least one of the base-station energy-saving information at the cell level, the base-station energy-saving information at the level of groups of terminals, and the base-station energy-saving information at the terminal level is updated; when the fourth bit field identifier indicates that the base-station energy-saving information at a target level is updated, and the third bit field identifier corresponding to the base-station energy-saving information at the target level indicates that the energy-saving information of the energy-saving solution of the target energy-saving domain is updated, the bit field identifier corresponding to the energy-saving information of the energy-saving solution of the target energy-saving domain contained in the base-station energy-saving information at the target level is used to indicate the updated energy-saving information; or when the third bit field identifier indicates that the energy-saving information of the energy-saving solution of the target energy-saving domain is updated, and the fourth bit field identifier indicates that the base-station energy-saving information at the target level is updated, the bit field identifier corresponding to the energy-saving information of the energy-saving solution of the target energy-saving domain contained in the base-station energy-saving information at the target level is used to indicate the updated energy-saving information, and the target level is one of the cell level, the level of groups of terminals, and the terminal level.

Optionally, the time-domain energy-saving solution includes at least one of the following: a transmission indication of a first object, wherein the first object includes a common signal and/or a common channel; a transmission indication of a second object, wherein the second object includes: at least one of a semi-persistent signal, a semi-persistent channel, a periodic signal, and a periodic channel; a dynamic cell shutdown indication; indications related to reference signals; an indication of a discontinuous reception configuration of a terminal; an indication of a discontinuous transmission configuration or a discontinuous reception configuration of a base station; indication of an energy-saving status of the base station.

Optionally, the frequency-domain energy-saving solution includes at least one of the following: dynamic bandwidth adjustment indication of terminal groups; shutdown indication of dynamic cells under multi-carrier; status indication of the secondary cell; a switching indication of dynamic primary cells of terminal groups; a parameter set switching indication for different frequency domain states of the base station.

Optionally the spatial-domain energy-saving solution includes at least one of the following: a switching indication of parameter sets of base-station spatial-domain unit parameters; instructions for adjusting base-station spatial-domain unit parameters; a configuration indication of a reference signal; a joint indication of a first spatial-domain unit parameter and a reference signal configuration, wherein the first spatial-domain unit parameter includes a quantity of spatial-domain units or a spatial-domain unit index; channel state information reference signal CSI-RS measurement or reporting configuration; dynamic adjustment power indication.

Optionally, the power-domain energy-saving solution includes at least one of the following: a transmit power of a first information; an offset value of the transmit power of the first information relative to a reference power; an indication of whether the transmit power of the first information is zero; the first information includes at least one of a target signal, a target channel, a target time resource, a target frequency-domain resource, and a target spatial-domain resource; the reference power is a transmit power of at least one of a reference signal, a reference channel, a reference time-domain resource, a reference frequency-domain resource, and a reference spatial-domain resource.

Optionally, the another energy-saving solution includes at least one of the following: a solution of power amplifier coefficient adjustment; a solution of peak to average power ratio reduction.

The information transmission device of the embodiment of the present disclosure receives dynamic signaling sent by the network side device, and the dynamic signaling is used to indicate at least one of the base-station energy-saving information at the cell level, the base-station energy-saving information at the level of groups of terminals, and the base-station energy-saving information at the terminal level; information is transmitted according to the indication of the dynamic signaling; wherein the base-station energy-saving information includes at least one of the following: energy-saving information of a time domain, the energy-saving information of a time domain includes energy-saving information of at least one time-domain energy-saving solution; energy-saving information of a frequency domain, the energy-saving information of a frequency domain includes energy-saving information of at least one frequency-domain energy-saving solution; energy-saving information of a spatial domain, the energy-saving information of a spatial domain includes energy-saving information of at least one spatial domain energy-saving solution; energy-saving information of a power domain, the energy-saving information of a power domain includes energy-saving information of at least one power-domain energy-saving solution; other energy-saving information other than the time domain, the frequency domain, the spatial domain and the power domain, the other energy-saving information includes energy-saving information of at least one another energy-saving solution, so that the information transmission is realized by receiving all the information on the base station energy-saving jointly indicated by the dynamic signaling and based on the flexible indication of the base-station energy-saving information.

It should be noted that the division of units in the embodiments of the present application is schematic and is only a logical function division. There may be other division methods in actual implementation. In addition, each functional unit in each embodiment of the present application may be integrated into a processing unit, or each unit may exist physically separately, or two or more units may be integrated into one unit. The above-mentioned integrated unit may be implemented in the form of hardware or in the form of software functional units.

If the integrated unit is implemented in the form of a software functional unit and sold or used as an independent product, it can be stored in a processor-readable storage medium. Based on this understanding, the technical solution of the present application is essentially or the part that contributes to the relevant technology or all or part of the technical solution can be embodied in the form of a software product. The computer software product is stored in a storage medium, including several instructions to enable a computer device (which can be a personal computer, server, or network device, etc.) or a processor (processor) to execute all or part of the steps of the method described in each embodiment of the present application. The aforementioned storage medium includes: U disk, mobile hard disk, read-only memory (Read-Only Memory, ROM), random access memory (Random Access Memory, RAM), disk or optical disk and other media that can store program code.

It should be noted here that the above-mentioned device provided in the embodiment of the present disclosure can implement all the method steps implemented in the above-mentioned method embodiment, and can achieve the same technical effect. The parts and beneficial effects of this embodiment that are the same as those in the method embodiment will not be described in detail here.

In some embodiments of the present disclosure, a processor-readable storage medium is further provided, wherein the processor-readable storage medium stores program instructions, and the program instructions are used to enable the processor to execute the following steps: receiving dynamic signaling from a network-side device, wherein the dynamic signaling is used to indicate at least one of base-station energy-saving information at a cell level, base-station energy-saving information at a level of groups of terminals, and base-station energy-saving information at a terminal level; performing information transmission according to the dynamic signaling; wherein the base-station energy-saving information includes at least one of the following: energy-saving information of a time domain, the energy-saving information of the time domain including energy-saving information of at least one time-domain energy-saving solution; energy-saving information of a frequency domain, the energy-saving information of the frequency domain including energy-saving information of at least one frequency-domain energy-saving solution; energy-saving information of a spatial domain, the energy-saving information of the spatial domain including energy-saving information of at least one spatial-domain energy-saving solution; energy-saving information of a power domain, the energy-saving information of the power domain including energy-saving information of at least one power-domain energy-saving solution; other energy-saving information of another domain other than the time domain, the frequency domain, the spatial domain, and the power domain, the other energy-saving information including energy-saving information of at least one another energy-saving solution.

When the program is executed by the processor, the processor can implement all the implementation methods of the method embodiment applied to the terminal side as shown in FIG. 14. To avoid repetition, they will not be repeated here.

The technical solutions in the embodiments of the present application can be applicable to a variety of systems, especially 5G systems. For example, the applicable system can be a global system of mobile communication (Global System of Mobile communication, GSM) system, a code division multiple access (Code Division Multiple Access, CDMA) system, a wideband code division multiple access (Wideband Code Division Multiple Access, WCDMA) general packet radio service (General Packet Radio Service, GPRS) system, a long-term evolution (Long Term Evolution, LTE) system, a LTE frequency division duplex (FDD) system, a LTE time division duplex (TDD) system, an advanced long-term evolution (Long Term Evolution Advanced, LTE-A) system, a universal mobile telecommunication system (Universal Mobile Telecommunication System, UMTS), a world-wide interoperability for Microwave Access (WiMAX) system, a 5G new radio (New Radio, NR) system, etc. These various systems include terminal equipment and network equipment. The system may also include core network parts, such as the Evolved Packet System (EPS), 5G System (5GS), etc.

The terminal device involved in the embodiment of the present application may be a device that provides voice and/or data connectivity to a user, a handheld device with a wireless connection function, or other processing devices connected to a wireless modem. In different systems, the name of the terminal device may also be different. For example, in a 5G system, the terminal device may be called a user equipment (UE). A wireless terminal device can communicate with one or more core networks (CN) via a radio access network (RAN). The wireless terminal device may be a mobile terminal device, such as a mobile phone (or a "cellular" phone) and a computer with a mobile terminal device. For example, it may be a portable, pocket-sized, handheld, computer-built-in or vehicle-mounted mobile device that exchanges language and/or data with a wireless access network. For example, personal communication service (PCS) phones, cordless phones, session initiation protocol (SIP) phones, wireless local loop (WLL) stations, personal digital assistants (PDAs) and other devices. The wireless terminal device may also be referred to as a system, a subscriber unit, a subscriber station, a mobile station, a mobile station, a remote station, an access point, a remote terminal device, an access terminal device, a user terminal device, a user agent, and a user device, but is not limited in the embodiments of the present application.

The network side device involved in the embodiment of the present application may be a base station, which may include multiple cells providing services for the terminal. Depending on the specific application scenario, the base station may also be called an access point, or may be a device in the access network that communicates with the wireless terminal device through one or more sectors on the air interface, or other names. The network side device may be used to interchange received air frames with Internet Protocol (IP) packets, and serve as a router between the wireless terminal device and the rest of the access network, wherein the rest of the access network may include an Internet Protocol (IP) communication network. The network side device may also coordinate the attribute management of the air interface. For example, the network side device involved in the embodiments of the present application can be a network side device (Base Transceiver Station, BTS) in the Global System for Mobile communications (Global System for Mobile communications, GSM) or Code Division Multiple Access (Code Division Multiple Access, CDMA), or a network side device (NodeB) in Wide-band Code Division Multiple Access (WCDMA), or an evolved network side device (evolutional Node B, eNB or e-NodeB) in the Long Term Evolution (Long Term Evolution, LTE) system, a 5G base station (gNB) in the 5G network architecture (next generation system), or a home evolved Node B (Home evolved Node B, HeNB), a relay node (relay node), a home base station (femto), a pico base station (pico), etc., which is not limited in the embodiments of the present application. In some network structures, the network side devices may include a centralized unit (CU) node and a distributed unit (DU) node, and the centralized unit and the distributed unit may also be arranged geographically separately.

The network side device and the terminal device can each use one or more antennas for multiple input multiple output (MIMO) transmission. MIMO transmission can be single user MIMO (SU-MIMO) or multi-user MIMO (MU-MIMO). According to the form and number of antenna combinations, MIMO transmission can be two-dimensional MIMO (2D-MIMO), three-dimensional MIMO (3D-MIMO), full-dimensional MIMO (FD-MIMO) or massive MIMO, or it can be diversity transmission, precoding transmission or beamforming transmission, etc.

It should be noted that the division of the above modules is only a division of logical functions. In actual implementation, they can be fully or partially integrated into one physical entity, or they can be physically separated. And these modules can all be implemented in the form of software called by processing elements; they can also be all implemented in the form of hardware; some modules can also be implemented in the form of software called by processing elements, and some modules can be implemented in the form of hardware. For example, the determination module can be a separately established processing element, or it can be integrated in a chip of the above-mentioned device for implementation. In addition, it can also be stored in the memory of the above-mentioned device in the form of program code, and called and executed by a processing element of the above-mentioned device. The implementation of other modules is similar. In addition, these modules can be fully or partially integrated together, or they can be implemented independently. The processing element described here can be an integrated circuit with signal processing capabilities. In the implementation process, each step of the above method or each module above can be completed by an integrated logic circuit of hardware in the processor element or instructions in the form of software.

For example, each module, unit, sub-unit or sub-module may be one or more integrated circuits configured to implement the above method, such as one or more application specific integrated circuits (ASIC), or one or more digital signal processors (DSP), or one or more field programmable gate arrays (FPGA). For another example, when a module above is implemented in the form of a processing element scheduling program code, the processing element may be a general-purpose processor, such as a central processing unit (CPU) or other processor that can call program code. For another example, these modules may be integrated together and implemented in the form of a system-on-a-chip (SOC).

The terms "first", "second", and the like in the present disclosure are used to distinguish similar objects, and are not necessarily used to describe a specific order or sequence. It should be understood that the terms used in this way can be interchanged where appropriate, so that the embodiments of the present disclosure described here, such as those illustrated or described here, are implemented in a sequence other than the order. In addition, the terms "including" and "having" and any of their variations are intended to cover non-exclusive inclusions, for example, a process, method, system, product or device that includes a series of steps or units is not necessarily limited to those steps or units clearly listed, but may include other steps or units that are not clearly listed or inherent to these processes, methods, products or devices. In addition, the use of "and/or" in the specification and claims represents at least one of the connected objects, such as A and/or B and/or C, indicating the inclusion of 7 situations including single A, single B, single C, and both A and B exist, both B and C exist, both A and C exist, and both A, B and C exist. Similarly, the use of "at least one of A and B" in the specification and claims should be understood as "single A, single B, or both A and B exist".

Those skilled in the art will appreciate that the embodiments of the present application may be provided as methods, systems, or computer program products. Therefore, the present application may take the form of a complete hardware embodiment, a complete software embodiment, or an embodiment combining software and hardware. Moreover, the present application may take the form of a computer program product implemented on one or more computer-usable storage media (including but not limited to disk storage and optical storage, etc.) containing computer-usable program codes.

The present application is described with reference to the flowcharts and/or block diagrams of the methods, devices (systems), and computer program products according to the embodiments of the present application. It should be understood that each process and/or box in the flowchart and/or block diagram, as well as the combination of the processes and/or boxes in the flowchart and/or block diagram, can be implemented by computer executable instructions. These computer executable instructions can be provided to a processor of a general-purpose computer, a special-purpose computer, an embedded processor, or other programmable data processing device to generate a machine, so that the instructions executed by the processor of the computer or other programmable data processing device generate a device for implementing the functions specified in one process or multiple processes in the flowchart and/or one box or multiple boxes in the block diagram.

These processor-executable instructions may also be stored in a processor-readable memory that can direct a computer or other programmable data processing device to operate in a specific manner, so that the instructions stored in the processor-readable memory produce a product including an instruction device that implements the functions specified in one or more processes in the flowchart and/or one or more boxes in the block diagram.

These processor-executable instructions may also be loaded onto a computer or other programmable data processing device so that a series of operational steps are executed on the computer or other programmable device to produce a computer-implemented process, whereby the instructions executed on the computer or other programmable device provide steps for implementing the functions specified in one or more flows in the flowchart and/or one or more blocks in the block diagram.

Obviously, those skilled in the art can make various changes and modifications to the present application without departing from the spirit and scope of the present application. Thus, if these modifications and variations of the present application fall within the scope of the claims of the present application and their equivalents, the present application is also intended to include these modifications and variations.

What is claimed is:

1. An information transmission method, applied to a network side device, comprising:
 sending dynamic signaling to a terminal, wherein the dynamic signaling is used to indicate at least one of base-station energy-saving information at a cell level, base-station energy-saving information at a level of a group of terminals, or base-station energy-saving information at a terminal level;
 the base-station energy-saving information comprises at least one of the following:
 energy-saving information of a time domain, the energy-saving information of the time domain comprising energy-saving information of at least one time-domain energy-saving solution;
 energy-saving information of a frequency domain, the energy-saving information of the frequency domain comprising energy-saving information of at least one frequency-domain energy-saving solution;
 energy-saving information of a spatial domain, the energy-saving information of the spatial domain comprising energy-saving information of at least one spatial-domain energy-saving solution; or
 energy-saving information of a power domain, the energy-saving information of the power domain comprising energy-saving information of at least one power-domain energy-saving solution.

2. The method according to claim 1, wherein the dynamic signaling is downlink control information DCI or media access control control element MAC-CE,
 wherein when the dynamic signaling is DCI, the DCI is DCI scrambled by at least one base-station energy-saving radio network temporary identifier RNTI.

3. The method according to claim 1, wherein the dynamic signaling is used to indicate the base-station energy-saving information of at least one terminal group;
 the base-station energy-saving information of each of the at least one terminal group comprises at least one of the energy-saving information of the time domain, the energy-saving information of the frequency domain, the energy-saving information of the spatial domain, or the energy-saving information of the power domain;
 or,
 wherein the dynamic signaling is used to indicate at least one of the energy-saving information of the time domain, the energy-saving information of the frequency domain, the energy-saving information of the spatial domain, or the energy-saving information of the power domain; wherein, the energy-saving information of each energy-saving domain of the time domain, the frequency domain, the spatial domain, or the power domain comprises energy-saving information for at least one terminal group of the energy-saving domain, and the energy-saving information of each of the at least one terminal group comprises energy-saving information of the at least one energy-saving solution of the energy-saving domain, and the energy-saving domain comprises one of the time domain, the frequency domain, the spatial domain, or the power domain;
 or,
 wherein the dynamic signaling is used to indicate at least one of the following: energy-saving information of at least one time-domain energy-saving solution; energy-saving information of at least one frequency-domain energy-saving solution; energy-saving information of at least one spatial-domain energy-saving solution; or energy-saving information of at least one power-domain energy-saving solution; wherein, the energy-saving information of each energy-saving solution of the time-domain energy-saving solution, the frequency-domain energy-saving solution, the spatial-domain energy-saving solution, or the power-domain energy-saving solution comprises energy-saving information of at least one terminal group, and the energy-saving domain corresponding to the energy-saving information of the at least one terminal group is the same as the energy-saving domain corresponding to the energy-saving information of the energy-saving solution, and the energy-saving domain comprises one of the time domain, the frequency domain, the spatial domain, or the power domain;

or, wherein the dynamic signaling is used to indicate at least one of the following: energy-saving information of at least one time-domain energy-saving solution; energy-saving information of at least one frequency-domain energy-saving solution; energy-saving information for at least one spatial-domain energy-saving solution; or energy-saving information of at least one power-domain energy-saving solution; wherein the energy-saving information of each energy-saving solution of the time-domain energy-saving solution, the frequency-domain energy-saving solution, the spatial-domain energy-saving solution, the power-domain energy-saving solution, and the energy-saving domain comprises one of the time domain, the frequency domain, the spatial domain, or the power domain.

4. The method according to claim 1, wherein the dynamic signaling comprises a first bit field identifier, and energy-saving information of energy-saving solutions of different energy-saving domains is indicated by the first bit field identifier; or, the dynamic signaling comprises a second bit field identifier and a radio resource control RRC identifier, and energy-saving information of energy-saving solutions of different energy-saving domains is jointly indicated by the second bit field identifier and the RRC identifier; or, the dynamic signaling comprises bit information representing a time-frequency-space domain unit, and energy-saving information of energy-saving solutions in different energy-saving domains is indicated by the bit information, and the energy-saving domain comprises one of a time domain, a frequency domain, a spatial domain, or a power domain.

5. The method according to claim 1, wherein the dynamic signaling comprises a third bit field identifier, and the third bit field identifier is used to indicate whether the energy-saving information of energy-saving solutions of different energy-saving domains is updated;

when the third bit field identifier indicates that the energy-saving information of an energy-saving solution of a target energy-saving domain in the different energy-saving domains is updated, the bit field identifier corresponding to the energy-saving information of the energy-saving solution of the target energy-saving domain is used to indicate the updated energy-saving information, and the energy-saving domain comprises one of the time domain, the frequency domain, the spatial domain, or the power domain.

6. The method according to claim 5, wherein the dynamic signaling further comprises a fourth bit field identifier, the fourth bit field identifier is used to indicate whether at least one of the base-station energy-saving information at the cell level, the base-station energy-saving information at the level of a group of terminals, or the base-station energy-saving information at the terminal level is updated;

when the fourth bit field identifier indicates that the base-station energy-saving information at a target level is updated, and the third bit field identifier corresponding to the base-station energy-saving information at the target level indicates that the energy-saving information of the energy-saving solution of the target energy-saving domain is updated, the bit field identifier corresponding to the energy-saving information of the energy-saving solution of the target energy-saving domain contained in the base-station energy-saving information at the target level is used to indicate the updated energy-saving information; or when the third bit field identifier indicates that the energy-saving information of the energy-saving solution of the target energy-saving domain is updated, and the fourth bit field identifier indicates that the base-station energy-saving information at the target level is updated, the bit field identifier corresponding to the energy-saving information of the energy-saving solution of the target energy-saving domain contained in the base-station energy-saving information at the target level is used to indicate the updated energy-saving information, and the target level is one of the cell level, the level of a group of terminals, and or the terminal level.

7. The method according to claim 1, wherein the method further comprises:

configuring at least one base-station energy-saving RNTI;

scrambling a first instruction according to the at least one base-station energy-saving RNTI, and obtaining the dynamic signaling;

wherein the at least one base-station energy-saving RNTI is used to indicate at least one of the following:

grouping of energy-saving information types;

grouping at the level of a group of terminals;

grouping at the cell level and the level of a group of terminals;

grouping at the cell level and the terminal level;

grouping at the level of a group of terminals and the terminal level; or grouping of information contents of energy-saving information types.

8. The method according to claim 1, wherein the time-domain energy-saving solution comprises at least one of the following:

a transmission indication of a first object, wherein the first object comprises a common signal and/or a common channel; a transmission indication of a second object, wherein the second object comprises: at least one of a semi-persistent signal, a semi-persistent channel, a periodic signal, and a periodic channel; a dynamic cell shutdown indication; indications related to reference signals; an indication of a discontinuous reception configuration of a terminal; an indication of a discontinuous transmission configuration or a discontinuous reception configuration of a base station; or indication of an energy-saving status of the base station;

and/or, wherein the frequency-domain energy-saving solution comprises at least one of the following: dynamic bandwidth adjustment indication of terminal groups; shutdown indication of dynamic cells under multi-carrier; status indication of the secondary cell; a switching indication of dynamic primary cells of terminal groups; or a parameter set switching indication for different frequency domain states of the base station;

and/or, wherein the spatial-domain energy-saving solution comprises at least one of the following: a switching indication of parameter sets of base-station spatial-domain unit parameters;

instructions for adjusting base-station spatial-domain unit parameters; a configuration indication of a reference signal; a joint indication of a first spatial-domain unit parameter and a reference signal configuration, wherein the first spatial-domain unit parameter comprises a quantity of spatial-domain units or a spatial-domain unit index; channel state information reference signal CSI-RS measurement or reporting configuration; dynamic adjustment power indication;

and/or, wherein the power-domain energy-saving solution comprises at least one of the following: a transmit power of a first information; an offset value of the transmit power of the first information relative to a reference power; an indication of whether the transmit power of the first information is zero; the first information comprises at least one of a target signal, a target channel, a target time resource, a target frequency-domain resource, or a target spatial-domain resource; the reference power is a transmit power of at least one of a reference signal, a reference channel, a reference time-domain resource, a reference frequency-domain resource, or a reference spatial-domain resource.

9. A network side device, comprising: a memory, a transceiver, and a processor, wherein the memory is used to store program instructions; the transceiver is used to send and receive data under the control of the processor; the processor is used to read the program instructions in the memory and perform steps of the information transmission method according to claim 1.

10. A non-transitory processor-readable storage medium storing a computer program, wherein the computer program is used to cause a processor to execute the steps of the information transmission method according to claim 1.

11. An information transmission method, applied to a terminal, comprising:

receiving dynamic signaling from a network-side device, wherein the dynamic signaling is used to indicate at least one of base-station energy-saving information at a cell level, base-station energy-saving information at a level of a group of terminals, or base-station energy-saving information at a terminal level;

performing information transmission according to the dynamic signaling;

wherein the base-station energy-saving information comprises at least one of the following:

energy-saving information of a time domain, the energy-saving information of the time domain comprising energy-saving information of at least one time-domain energy-saving solution;

energy-saving information of a frequency domain, the energy-saving information of the frequency domain comprising energy-saving information of at least one frequency-domain energy-saving solution;

energy-saving information of a spatial domain, the energy-saving information of the spatial domain comprising energy-saving information of at least one spatial-domain energy-saving solution; or energy-saving information of a power domain, the energy-saving information of the power domain comprising energy-saving information of at least one power-domain energy-saving solution.

12. The method according to claim 11, wherein performing the information transmission according to the dynamic signaling comprises:

according to the dynamic signaling, obtaining target base-station energy-saving information corresponding to the terminal;

performing the information transmission according to the target base-station energy-saving information.

13. The method according to claim 11, wherein the dynamic signaling is downlink control information DCI or media access control control element MAC-CE, wherein when the dynamic signaling is DCI, the DCI is DCI scrambled by a base-station energy-saving radio network temporary identifier RNTI.

14. The method according to claim 11, wherein the dynamic signaling is used to indicate the base-station energy-saving information of at least one terminal group; the base-station energy-saving information of each of the at least one terminal group comprises at least one of the energy-saving information of the time domain, the energy-saving information of the frequency domain, the energy-saving information of the spatial domain, or the energy-saving information of the power domain;

or, wherein the dynamic signaling is used to indicate at least one of the energy-saving information of the time domain, the energy-saving information of the frequency domain, the energy-saving information of the spatial domain, or the energy-saving information of the power domain; wherein, the energy-saving information of each energy-saving domain of the time domain, the frequency domain, the spatial domain, or the power domain comprises energy-saving information for at least one terminal group of the energy-saving domain, and the energy-saving information of each of the at least one terminal group comprises energy-saving information of the at least one energy-saving solution of the energy-saving domain, and the energy-saving domain comprises one of the time domain, the frequency domain, the spatial domain, or the power domain;

or, wherein the dynamic signaling is used to indicate at least one of the following: energy-saving information of at least one time-domain energy-saving solution; energy-saving information of at least one frequency-domain energy-saving solution; energy-saving information of at least one spatial-domain energy-saving solution; or energy-saving information of at least one power-domain energy-saving solution; wherein, the energy-saving information of each energy-saving solution of the time-domain energy-saving solution, the frequency-domain energy-saving solution, the spatial-domain energy-saving solution, the power-domain energy-saving solution, and the energy-saving domain comprises one of the time domain, the frequency domain, the spatial domain, or the power domain;

or, wherein the dynamic signaling is used to indicate at least one of the following: energy-saving information of at least one time-domain energy-saving solution; energy-saving information of at least one frequency-domain energy-saving solution; energy-saving information for at least one spatial-domain energy-saving solution; or energy-saving information of at least one power-domain energy-saving solution; wherein the energy-saving information of each energy-saving solution of the time-domain energy-saving solution, the frequency-domain energy-saving solution, the spatial-domain energy-saving solution, or the power-domain energy-saving solution, and the energy-saving domain comprises one of the time domain, the frequency domain, the spatial domain, or the power domain.

15. The method according to claim 11, wherein the dynamic signaling comprises a first bit field identifier, and energy-saving information of energy-saving solutions of different energy-saving domains is indicated by the first bit field identifier; or, the dynamic signaling comprises a second bit field identifier and a radio resource control RRC identifier, and energy-saving information of energy-saving solutions of different energy-saving domains is jointly indicated by the second bit field identifier and the RRC identifier; or, the dynamic signaling comprises bit information representing a time-frequency-space domain unit, and energy-saving information of energy-saving solutions in different energy-saving domains is indicated by the bit information, and the energy-saving domain comprises one of a time domain, a frequency domain, a spatial domain, or a power domain.

16. The method according to claim 11, wherein the dynamic signaling comprises a third bit field identifier, and the third bit field identifier is used to indicate whether the energy-saving information of energy-saving solutions of different energy-saving domains is updated;

when the third bit field identifier indicates that the energy-saving information of an energy-saving solution of a target energy-saving domain in the different energy-saving domains is updated, the bit field identifier corresponding to the energy-saving information of the energy-saving solution of the target energy-saving domain is used to indicate the updated energy-saving information, and the energy-saving domain comprises one of the time domain, the frequency domain, the spatial domain, or the power domain.

17. The method according to claim 16, wherein the dynamic signaling further comprises a fourth bit field identifier, the fourth bit field identifier is used to indicate whether at least one of the base-station energy-saving information at the cell level, the base-station energy-saving information at the level of a group of terminals, or the base-station energy-saving information at the terminal level is updated;

when the fourth bit field identifier indicates that the base-station energy-saving information at a target level is updated, and the third bit field identifier corresponding to the base-station energy-saving information at the target level indicates that the energy-saving information of the energy-saving solution of the target energy-saving domain is updated, the bit field identifier corresponding to the energy-saving information of the energy-saving solution of the target energy-saving domain contained in the base-station energy-saving information at the target level is used to indicate the updated energy-saving information; or when the third bit field identifier indicates that the energy-saving information of the energy-saving solution of the target energy-saving domain is updated, and the fourth bit field identifier indicates that the base-station energy-saving information at the target level is updated, the bit field identifier corresponding to the energy-saving information of the energy-saving solution of the target energy-saving domain contained in the base-station energy-saving information at the target level is used to indicate the updated energy-saving information, and the target level is one of the cell level, the level of a group of terminals, or the terminal level.

18. The method according to claim 11, wherein the time-domain energy-saving solution comprises at least one of the following:

a transmission indication of a first object, wherein the first object comprises a common signal and/or a common channel;

a transmission indication of a second object, wherein the second object comprises: at least one of a semi-persistent signal, a semi-persistent channel, a periodic signal, or a periodic channel;

a dynamic cell shutdown indication;

indications related to reference signals;

an indication of a discontinuous reception configuration of a terminal;

an indication of a discontinuous transmission configuration or a discontinuous reception configuration of a base station; or indication of an energy-saving status of the base station; and/or, wherein the frequency-domain energy-saving solution comprises at least one of the following: dynamic bandwidth adjustment indication of terminal groups; shutdown indication of dynamic cells under multi-carrier; status indication of the secondary cell; a switching indication of dynamic primary cells of terminal groups; or a parameter set switching indication for different frequency domain states of the base station;

and/or, wherein the spatial-domain energy-saving solution comprises at least one of the following: a switching indication of parameter sets of base-station spatial-domain unit parameters;

instructions for adjusting base-station spatial-domain unit parameters; a configuration indication of a reference signal; a joint indication of a first spatial-domain unit parameter and a reference signal configuration, wherein the first spatial-domain unit parameter comprises a quantity of spatial-domain units or a spatial-domain unit index; channel state information reference signal CSI-RS measurement or reporting configuration; or dynamic adjustment power indication;

and/or, wherein the power-domain energy-saving solution comprises at least one of the following: a transmit power of a first information; an offset value of the transmit power of the first information relative to a reference power; or an indication of whether the transmit power of the first information is zero; the first information comprises at least one of a target signal, a target channel, a target time resource, a target frequency-domain resource, or a target spatial-domain resource; the reference power is a transmit power of at least one of a reference signal, a reference channel, a reference time-domain resource, a reference frequency-domain resource, or a reference spatial-domain resource.

19. A non-transitory processor-readable storage medium storing a computer program, wherein the computer program is used to cause a processor to execute the steps of the information transmission method according to claim 11.

20. A terminal comprising: a memory, a transceiver, and a processor, wherein the memory is used to store program instructions; the transceiver is used to send and receive data under the control of the processor; the processor is used to read the program instructions in the memory and perform the following operations:

receiving dynamic signaling from a network-side device through the transceiver, wherein the dynamic signaling is used to indicate at least one of base-station energy-saving information at a cell level, base-station energy-saving information at a level of a group of terminals, or base-station energy-saving information at a terminal level;

performing information transmission according to the dynamic signaling;

wherein the base-station energy-saving information comprises at least one of the following:

energy-saving information of a time domain, the energy-saving information of the time domain comprising energy-saving information of at least one time-domain energy-saving solution;

energy-saving information of a frequency domain, the energy-saving information of the frequency domain comprising energy-saving information of at least one frequency-domain energy-saving solution;

energy-saving information of a spatial domain, the energy-saving information of the spatial domain comprising energy-saving information of at least one spatial-domain energy-saving solution; or energy-saving information of a power domain, the energy-saving information of the power domain comprising energy-saving information of at least one power-domain energy-saving solution.

* * * * *